United States Patent
Osawa

(10) Patent No.: US 11,394,890 B2
(45) Date of Patent: Jul. 19, 2022

(54) IMAGE PICKUP APPARATUS THAT CONTROLS FLASH PHOTOGRAPHY, CONTROL METHOD THEREFOR, AND STORAGE MEDIUM

(71) Applicant: CANON KABUSHIKI KAISHA, Tokyo (JP)

(72) Inventor: Toshifumi Osawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 174 days.

(21) Appl. No.: 16/791,262

(22) Filed: Feb. 14, 2020

(65) Prior Publication Data

US 2020/0275007 A1    Aug. 27, 2020

(30) Foreign Application Priority Data

Feb. 21, 2019   (JP) .............................. JP2019-029680

(51) Int. Cl.
*H04N 5/235* (2006.01)
*G06T 7/20* (2017.01)

(52) U.S. Cl.
CPC ............. *H04N 5/2354* (2013.01); *G06T 7/20* (2013.01); *H04N 5/2351* (2013.01); *G06T 2207/30201* (2013.01)

(58) Field of Classification Search
CPC ............... H04N 5/2354; H04N 5/2351; H04N 5/23212; H04N 5/23245; H04N 5/23219;
(Continued)

(56) References Cited

U.S. PATENT DOCUMENTS 6,928,239 B2   8/2005   Fukui
7,889,890 B2   2/2011   Miyazaki
(Continued)

FOREIGN PATENT DOCUMENTS

| CN | 1525233 A | 9/2004 |
| JP | 2005-184508 A | 7/2005 |
| JP | 2006-074164 A | 3/2006 |

OTHER PUBLICATIONS

Aug. 31, 2021 Chinese Official Action in Chinese Patent Appln. No. 202010107465.2.
(Continued)

*Primary Examiner* — Lin Ye
*Assistant Examiner* — Tuan H Le
(74) *Attorney, Agent, or Firm* — Venable LLP

(57) ABSTRACT

An image pickup apparatus which is capable of selecting whether to carry out a subject detecting process while achieving a balance, thus preventing execution thereof from increasing shutter release time lag and excessively decreasing continuous shooting speed. Based on conditions as to shooting, whether or not to carry out a detecting process for detecting an area of a subject from an image generated by a sensor is selected for each of a first image generated based on a signal from the sensor when no flash is fired, and a second image generated based on a signal from the sensor when a pre-flash is fired. The amount of main flash output is computed based on luminance information on the area of the subject from at least one of the first and second images for which it has been determined that the detecting process is to be carried out.

20 Claims, 16 Drawing Sheets

| | CONDITIONS | FACE DETECTION UNDER AMBIENT LIGHT | FACE DETECTION DURING PRE-FLASHING |
|---|---|---|---|
| (1) | SHOOTING MODE SETTING IS NON-PEOPLE SHOOTING | 0 | 0 |
| (2) | SUBJECT TRACKING SETTING IS NON-FACE TRACKING MODE | 0 | 0 |
| (3)-1 | SETTING AS TO SHOOTING FOR SECOND AND SUBSEQUENT FRAMES IN CONTINUOUS SHOOTING IN SERVO AF MODE IN PEOPLE SHOOTING MODE IS FOCUS PRIORITY | 1 | 1 |
| (3)-2 | CONDITION (3)-1 IS SATISFIED, AND FACE SIZE DETECTED IN LAST METERING IS EQUAL TO OR GREATER THAN PREDETERMINED VALUE | 1 (R OR L) | 1 (R OR L) |
| (4)-1 | SETTING AS TO SHOOTING FOR SECOND AND SUBSEQUENT FRAMES IN CONTINUOUS SHOOTING IN SERVO AF MODE IN FACE TRACKING MODE IS FOCUS PRIORITY | 1 | 1 |
| (4)-2 | CONDITION (4)-1 IS SATISFIED, AND FACE SIZE DETECTED IN LAST METERING IS EQUAL TO OR GREATER THAN PREDETERMINED VALUE | 1 (R OR L) | 1 (R OR L) |
| (5) | SETTING AS TO SHOOTING FOR SECOND AND SUBSEQUENT FRAMES IN CONTINUOUS SHOOTING IN SERVO AF MODE IN LOW-SPEED CONTINUOUS SHOOTING MODE IS FOCUS PRIORITY | 1 | 1 |
| (6) | CONDITIONS (1) TO (5) ARE NOT SATISFIED, AND FACE IS DETECTED UNDER AMBIENT LIGHT IN LAST METERING | 1 | 0 |
| (7) | CONDITIONS (1) TO (5) ARE NOT SATISFIED, AND FACE IS DETECTED DURING PRE-FLASHING IN LAST METERING | 0 | 1 |
| (8)-1 | CONDITIONS (1) TO (5) ARE NOT SATISFIED, AND NO FACE IS DETECTED UNDER AMBIENT LIGHT OR DURING PRE-FLASHING IN LAST METERING | 1 | 1 |
| (8)-2 | CONDITIONS (1) TO (7) ARE SATISFIED, AND FACE IS DETECTED IN SECOND LAST METERING, AND BASED ON INFORMATION ABOUT FACE POSITION, THERE IS POSITION WHERE FACE IS EXPECTED TO BE DETECTED | 1 (T) | 1 (T) |

(58) Field of Classification Search
CPC ........ H04N 5/2256; H04N 9/735; G06T 7/20; G06T 2207/30201
See application file for complete search history.

(56) References Cited

U.S. PATENT DOCUMENTS

| | | |
|---|---|---|
| 2004/0170420 A1 | 9/2004 | Fukui |
| 2006/0044422 A1 | 3/2006 | Miyazaki |
| 2007/0165115 A1* | 7/2007 | Sugimoto .......... H04N 5/23218 348/231.2 |
| 2007/0189758 A1 | 8/2007 | Iwasaki |
| 2008/0024616 A1* | 1/2008 | Takahashi .............. H04N 5/353 348/221.1 |
| 2008/0062275 A1 | 3/2008 | Miyazaki |
| 2009/0207281 A1* | 8/2009 | Ono ................. H04N 5/232939 348/234 |
| 2009/0231468 A1 | 9/2009 | Yasuda |
| 2011/0044680 A1* | 2/2011 | Fukui ................... H04N 5/2353 396/164 |
| 2011/0205403 A1 | 8/2011 | Ito |
| 2016/0119525 A1 | 4/2016 | Wolf |
| 2017/0324909 A1* | 11/2017 | Choi .................... H04N 5/2355 |

OTHER PUBLICATIONS

Jan. 13, 2022 Chinese Official Action in Chinese Patent Appln. No. 202010107465.2.

* cited by examiner

| B | G1 |
|---|---|
| G2 | R |

FIG. 5

| | SETTING ITEM | FIRST OPTION | SECOND OPTION | THIRD OPTION |
|---|---|---|---|---|
| (1) | SHOOTING MODE SETTING | PEOPLE SHOOTING | NON-PEOPLE SHOOTING | GENERAL-PURPOSE |
| (2) | CONTINUOUS SHOOTING SETTING | HIGH-SPEED CONTINUOUS SHOOTING | LOW-SPEED CONTINUOUS SHOOTING | |
| (3) | AF MODE SETTING | ONE-SHOT AF | SERVO AF | |
| (4) | SERVO AF FIRST FRAME SETTING | FOCUS PRIORITY | RELEASE PRIORITY | BALANCE |
| (5) | SERVO AF IN-CONTINUOUS SHOOTING SETTING | FOCUS PRIORITY | CONTINUOUS SHOOTING SPEED PRIORITY | BALANCE |
| (6) | ONE-SHOT AF MODE SETTING | FOCUS PRIORITY | RELEASE PRIORITY | BALANCE |
| (7) | SUBJECT TRACKING SETTING | FACE TRACKING | NON-FACE TRACKING | |

*FIG. 10A*

| | CONDITIONS | FACE DETECTION UNDER AMBIENT LIGHT | FACE DETECTIO DURING PRE-FLASHING |
|---|---|---|---|
| (1) | SHOOTING MODE SETTING IS NON-PEOPLE SHOOTING | 0 | 0 |
| (2) | SETTING AS TO SHOOTING FOR FIRST FRAME IS RELEASE PRIORITY WHEN SERVO AF MODE IS SET | 0 | 0 |
| (3) | SETTING AS TO SHOOTING IS RELEASE PRIORITY WHEN ONE-SHOT AF MODE IS SET | 0 | 0 |
| (4) | SUBJECT TRACKING SETTING IS NON-FACE TRACKING MODE | 0 | 0 |
| (5) | CONDITIONS (1) TO (4) ARE NOT SATISFIED, AND ULTRA-DISTANT SUBJECT SHOOTING IS LIKELY | 1 | 0 |
| (6) | CONDITIONS (1) TO (5) ARE NOT SATISFIED, ULTRA-LOW LUMINANCE SUBJECT SHOOTING IS LIKELY | 0 | 1 |
| (7) | CONDITIONS (1) TO (6) ARE NOT SATISFIED | 1 | 1 |

FIG. 10B

| | CONDITIONS | FACE DETECTION UNDER AMBIENT LIGHT | FACE DETECTION DURING PRE-FLASHING |
|---|---|---|---|
| (1) | SHOOTING MODE SETTING IS NON-PEOPLE SHOOTING | 0 | 0 |
| (2) | SUBJECT TRACKING SETTING IS NON-FACE TRACKING MODE | 0 | 0 |
| (3) | SETTING AS TO SHOOTING FOR SECOND AND SUBSEQUENT FRAMES IN CONTINUOUS SHOOTING IN SERVO AF MODE IN PEOPLE SHOOTING MODE IS FOCUS PRIORITY | 1 | 1 |
| (4) | SETTING AS TO SHOOTING FOR SECOND AND SUBSEQUENT FRAMES IN CONTINUOUS SHOOTING IN SERVO AF MODE IN FACE TRACKING MODE IS FOCUS PRIORITY | 1 | 1 |
| (5) | SETTING AS TO SHOOTING FOR SECOND AND SUBSEQUENT FRAMES IN CONTINUOUS SHOOTING IN SERVO AF MODE IN LOW SPEED CONTINUOUS SHOOTING MODE IS FOCUS PRIORITY | 1 | 1 |
| (6) | CONDITIONS (1) TO (5) ARE NOT SATISFIED, AND FACE IS DETECTED UNDER AMBIENT LIGHT IN LAST METERING | 1 | 0 |
| (7) | CONDITIONS (1) TO (5) ARE NOT SATISFIED, AND FACE IS DETECTED DURING PRE-FLASHING IN LAST METERING | 0 | 1 |
| (8) | CONDITIONS (1) TO (5) ARE NOT SATISFIED, AND NO FACE IS DETECTED UNDER AMBIENT LIGHT OR DURING PRE-FLASHING IN LAST METERING | 1 | 1 |

FIG. 14

| | CONDITIONS | FACE DETECTION UNDER AMBIENT LIGHT | FACE DETECTION DURING PRE-FLASHING |
|---|---|---|---|
| (1) | SHOOTING MODE SETTING IS NON-PEOPLE SHOOTING | 0 | 0 |
| (2) | SETTING AS TO SHOOTING FOR FIRST FRAME IS RELEASE PRIORITY WHEN SERVO AF MODE IS SET | 0 | 0 |
| (3) | SETTING AS TO SHOOTING IS RELEASE PRIORITY WHEN ONE-SHOT AF MODE IS SET | 0 | 0 |
| (4) | SUBJECT TRACKING SETTING IS NON-FACE TRACKING MODE | 0 | 0 |
| (5) | CONDITIONS (1) TO (4) ARE NOT SATISFIED, AND ULTRA-DISTANT SUBJECT SHOOTING IS LIKELY | 1 | 0 |
| (6) | CONDITIONS (1) TO (5) ARE NOT SATISFIED, AND ULTRA-LOW LUMINANCE SUBJECT SHOOTING IS LIKELY | 0 | 1 |
| (7)-1 | CONDITIONS (1) TO (5) ARE NOT SATISFIED, AND SHOOTING MODE IS UNIVERSAL | 1 (R OR L) | 1 (R OR L) |
| (7)-2 | CONDITIONS (1) TO (7)-1 ARE NOT SATISFIED, AND SHOOTING MAGNIFICATION IS EQUAL TO OR GREATER THAN PREDETERMINED VALUE | 1 (R OR L) | 1 (R OR L) |
| (7)-3 | CONDITIONS (1) TO (7)-2 ARE NOT SATISFIED | 1 | 1 |

FIG. 15

| | CONDITIONS | FACE DETECTION UNDER AMBIENT LIGHT | FACE DETECTION DURING PRE-FLASHING |
|---|---|---|---|
| (1) | SHOOTING MODE SETTING IS NON-PEOPLE SHOOTING | 0 | 0 |
| (2) | SUBJECT TRACKING SETTING IS NON-FACE TRACKING MODE | 0 | 0 |
| (3)-1 | SETTING AS TO SHOOTING FOR SECOND AND SUBSEQUENT FRAMES IN CONTINUOUS SHOOTING IN SERVO AF MODE IN PEOPLE SHOOTING MODE IS FOCUS PRIORITY | 1 | 1 |
| (3)-2 | CONDITION (3)-1 IS SATISFIED, AND FACE SIZE DETECTED IN LAST METERING IS EQUAL TO OR GREATER THAN PREDETERMINED VALUE | 1 (R OR L) | 1 (R OR L) |
| (4)-1 | SETTING AS TO SHOOTING FOR SECOND AND SUBSEQUENT FRAMES IN CONTINUOUS SHOOTING IN SERVO AF MODE IN FACE TRACKING MODE IS FOCUS PRIORITY | 1 | 1 |
| (4)-2 | CONDITION (4)-1 IS SATISFIED, AND FACE SIZE DETECTED IN LAST METERING IS EQUAL TO OR GREATER THAN PREDETERMINED VALUE | 1 (R OR L) | 1 (R OR L) |
| (5) | SETTING AS TO SHOOTING FOR SECOND AND SUBSEQUENT FRAMES IN CONTINUOUS SHOOTING IN SERVO AF MODE IN LOW-SPEED CONTINUOUS SHOOTING MODE IS FOCUS PRIORITY | 1 | 1 |
| (6) | CONDITIONS (1) TO (5) ARE NOT SATISFIED, AND FACE IS DETECTED UNDER AMBIENT LIGHT IN LAST METERING | 1 | 0 |
| (7) | CONDITIONS (1) TO (5) ARE NOT SATISFIED, AND FACE IS DETECTED DURING PRE-FLASHING IN LAST METERING | 0 | 1 |
| (8)-1 | CONDITIONS (1) TO (5) ARE NOT SATISFIED, AND NO FACE IS DETECTED UNDER AMBIENT LIGHT OR DURING PRE-FLASHING IN LAST METERING | 1 | 1 |
| (8)-2 | CONDITIONS (1) TO (7) ARE SATISFIED, AND FACE IS DETECTED IN SECOND LAST METERING, AND BASED ON INFORMATION ABOUT FACE POSITION, THERE IS POSITION WHERE FACE IS EXPECTED TO BE DETECTED | 1 (T) | 1 (T) |

IMAGE PICKUP APPARATUS THAT CONTROLS FLASH PHOTOGRAPHY, CONTROL METHOD THEREFOR, AND STORAGE MEDIUM

BACKGROUND OF THE INVENTION

Field of the Invention

The present invention relates to an image pickup apparatus that controls flash photography, a control method therefor, and a storage medium.

Description of the Related Art

Conventionally, in flash photography, a preflash is fired before firing of a main flash, and based on a photometric value of light reflected off a subject when the preflash is fired, the amount of flash output during firing of the main flash is determined.

Japanese Laid-Open Patent Publication (Kokai) No. 2005-184508 discloses a technique for improving camera exposure accuracy in portrait photography by obtaining an image from light reflected off a subject when a pre-flash is fired, and using a result of face detection based on the image to determine the amount of flash output when a main flash is fired.

Japanese Laid-Open Patent Publication (Kokai) No. 2006-074164 discloses a technique for improving face detection accuracy by performing face detection using an image obtained before firing of a pre-flash and an image obtained during firing of the preflash and comparing detection results with each other.

In a case where an image pickup apparatus such as a digital camera detects a face as a specific subject from an obtained image, a detecting process therefor is usually carried out by dedicated face detecting hardware built in an image processing ASIC. A time period on the order of 1 ms to 10 ms is required for the face detecting hardware to detect a face from an obtained image. This time period increases with resolution and size of the obtained image. A single product is usually equipped with only one piece of face detecting hardware because of constraints on cost or the like, and hence in the case where face detection is performed using two images as disclosed in Japanese Laid-Open Patent Publication (Kokai) No. 2006-074164, the time period required for face detection is twice as long as the time period required for face detection using only one image. If a long time period is thus required for face detection, problems arise such as an increase in shutter release time lag and a decrease in continuous shooting speed.

On the other hand, in a case where, for example, a specific subject such as a face is tracked and shot, high subject detection accuracy is required even if the above problems arise.

SUMMARY OF THE INVENTION

The present invention provides an image pickup apparatus and a control method therefor, which are capable of selecting whether or not to carry out a subject detecting process while achieving a good balance, thus preventing execution of the subject detecting process from increasing shutter release time lag and excessively decreasing continuous shooting speed, as well as a storage medium.

Accordingly, the present invention provides an image pickup apparatus capable of photography with a flash, comprising a sensor comprising a plurality of pixels; and at least one processor or circuit configured to function as a detection unit configured to detect an area of a subject from an image generated by the sensor, a selecting unit configured to, based on conditions as to shooting, select whether or not to carry out the detecting process for each of the following: a first image generated based on a signal from the sensor when the flash does not fire a flash, and a second image generated based on a signal from the sensor when the flash fires a preflash, an obtaining unit configured to obtain luminance information on the area of the subject from at least one of the first and second images for which it has been determined that the detecting process is to be carried out, and a computation unit configured to compute an amount of main flash output from the flash based on the luminance information obtained by the obtaining unit.

According to the present invention, whether or not to carry out a subject detecting process is selected while a good balance is achieved, and this prevents execution of the subject detecting process from increasing shutter release time lag and excessively decreasing continuous shooting speed.

Further features of the present invention will become apparent from the following description of exemplary embodiments (with reference to the attached drawings).

BRIEF DESCRIPTION OF THE DRAWINGS

FIG. 5 is view showing a list of setting items configured by a user when taking a shot with the camera.

FIG. 10A is a view showing a table for use in the pre shooting start face detection selecting process in FIG. 8 according to the first embodiment of the present invention.

FIG. 10B is a view showing a table for use in the continuous shooting frame-to-frame face detection selection process in FIG. 9 according to the first embodiment of the present invention.

FIG. 14 is a view showing a table for use in the pre shooting start face detection selecting process in FIG. 8 according to a second embodiment of the present invention.

FIG. 15 is a view showing a table for use in the continuous shooting frame-to-frame face detection selecting process in FIG. 9 according to the second embodiment of the present invention.

DESCRIPTION OF THE EMBODIMENTS

The present invention will now be described in detail with reference to the drawings showing embodiments thereof.

Figure 1:
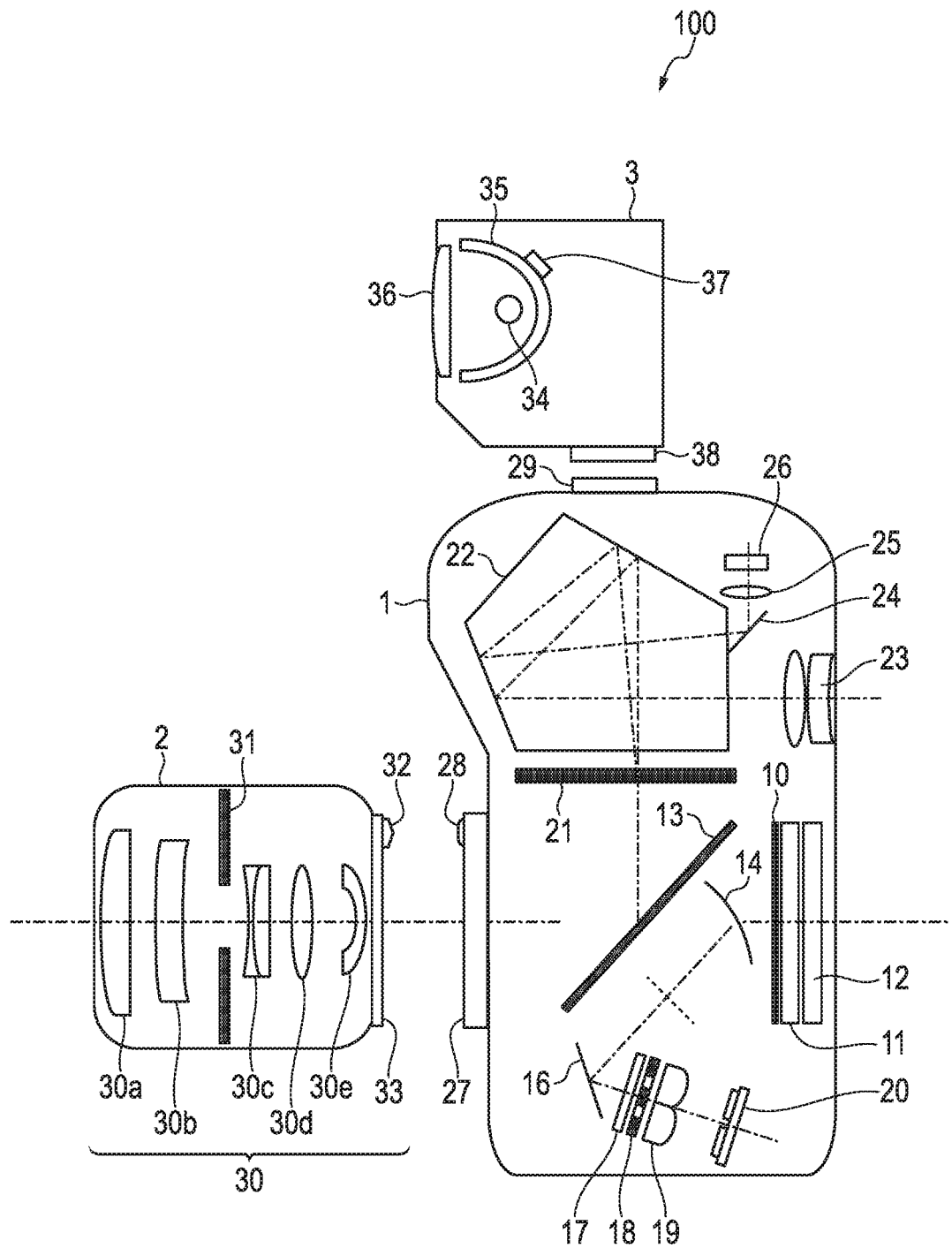
FIG. 1 is a cross-sectional view of a camera which is an image pickup apparatus according to a first embodiment of the present invention and comprised of a camera main body, an interchangeable lens, and a flash.

FIG. 1 is a cross-sectional view of a camera 100 which is an image pickup apparatus according to a first embodiment of the present invention and comprised of a camera main body 1, an interchangeable lens 2, and a flash 3.

As shown in FIG. 1, the camera 100 is what is called a single-lens reflex camera with interchangeable lenses.

The camera main body 1 has a mechanical shutter 10, an optical low-pass filter 11, an image pickup device 12, a semi-transparent main mirror 13, a first reflective mirror 14, a second reflective mirror 16, an infrared cut filter 17, a diaphragm 18, a secondary image forming lens 19, and a focus detecting sensor 20.

The image pickup device 12 is comprised of an area accumulating-type photoelectric conversion element such as a CMOS or CCD.

The main mirror 13 and the first reflective mirror 14 are positioned as shown in FIG. 1 while shooting is not performed, and both of them pop up when shooting is performed. When shooting is not performed, the first reflective mirror 14 forms a paraxial image forming surface and conjugate to a light incident surface of the image pickup device 12 as indicated by dotted lines in FIG. 1.

The diaphragm 18 has two openings.

Figure 2:
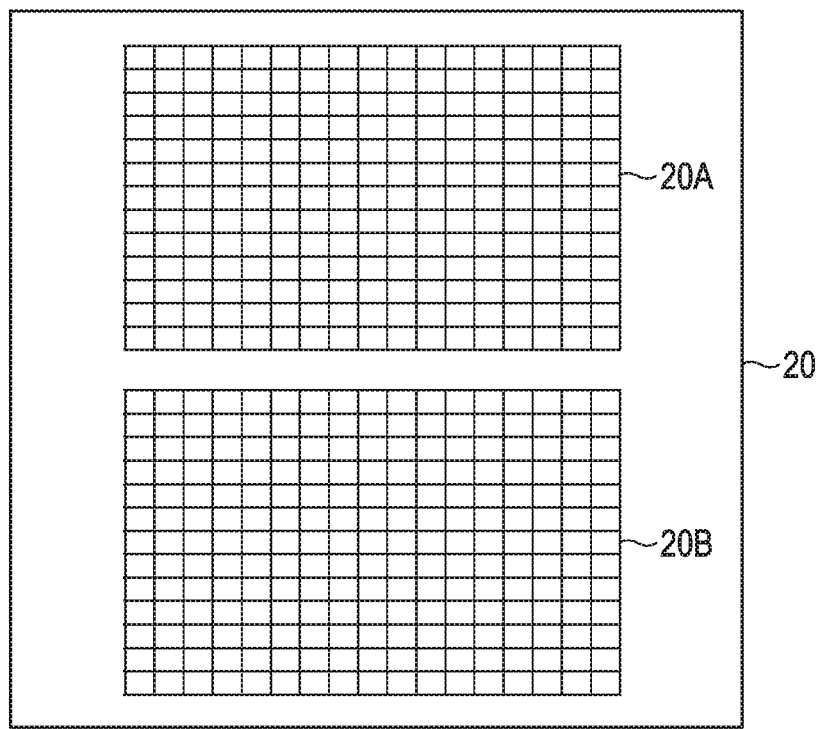
FIG. 2 is a view showing an arrangement of a focus detecting sensor in FIG. 1.

The focus detecting sensor 20 is comprised of an area accumulating-type photoelectric conversion element such as a CMOS, and as shown in FIG. 2, has two pairs of light receiving sensor units 20A and 20B which correspond to the two respective openings of the diaphragm 18 and each of which is divided into multiple areas. A signal accumulation unit, a peripheral circuit for signal processing, and so forth, not shown, as well as the light receiving sensor units 20A and 20B are fabricated as an integrated circuit on the same chip.

Since the components from the reflective mirror 14 to the focus detecting sensor 20 are arranged as described above when shooting is not performed, focus detection is possible at an arbitrary position within the light incident surface of the image pickup device 12 using the phase difference detection method.

The camera main body 1 also has a focusing screen 21, a pentaprism 22, an eyepiece lens 23, a third reflective mirror 24, a condenser lens 25, and a photometric sensor 26.

The focusing screen 21 is capable of diffusing light.

The photometric sensor 26 is a sensor for metering a luminance of a subject (incident image) to obtain luminance information on it and comprised of, for example, an area accumulation type photoelectric conversion element such as a CMOS.

Figures 3A, 3B:
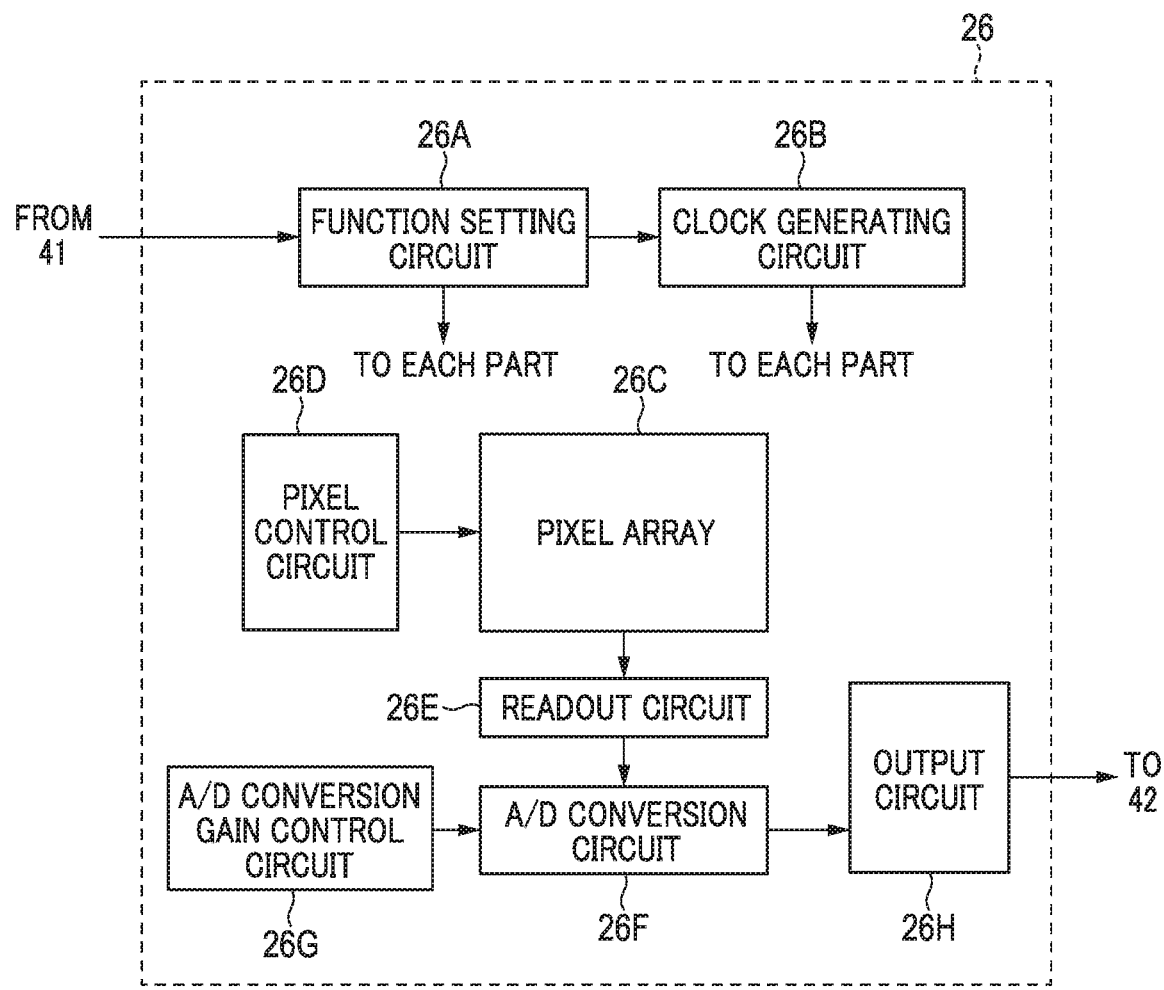
FIG. 3A is a view showing an arrangement of a photometric sensor in FIG. 1.
FIG. 3B is a view showing an arrangement of each unit of pixels in a pixel array in FIG. 3A.

Specifically, as shown in FIG. 3A, the photometric sensor 26 has a function setting circuit 26A, a clock generating circuit 26B, a pixel array 26C, a pixel control circuit 26D, a readout circuit 26E, an A/D conversion circuit 26F, an A/D conversion gain control circuit 26G, and an output circuit 26H.

The function setting circuit 26A controls an operating clock and accumulation inside the photometric sensor 26, A/D conversion, and so forth in accordance with data sent from a control circuit 41, which will be described later.

The clock generating circuit 26B is a circuit that generates an operating clock inside the photometric sensor 26.

The pixel array 26C is an arrangement of light receiving units of a plurality of pixels, for example, several tens of thousands of pixels to hundreds of thousands of pixels for photoelectric conversion.

In the first embodiment, each unit in the pixel array 26C has color filters in the Bayer arrangement comprised of a blue transparent filter B, green transparent filters G1 and G2, a red transparent filter R. The pixel array 26c, however, may not have the color filters in the Bayer arrangement but may accumulate monochrome signal data in each pixel.

The pixel control circuit 26D is a circuit that controls pixel scanning when accumulation in or readout from the pixel array 26C is controlled.

The readout circuit 26E is a circuit for successively reading out signal data comprised of analog signals accumulated in the pixels of the pixel array 26C. The analog signals accumulated in the pixels and output from the readout circuit 26E are input to the A/D conversion circuit 26F and converted into digital data.

The A/D conversion gain control circuit 26G is a circuit that adjusts a conversion gain for the A/D conversion circuit 26F.

The output circuit 26H outputs the signal data read out from the pixels of the pixel array 26C and converted into the digital data by the A/D conversion circuit 26F to a signal processing circuit 42, which will be described later. The output circuit 26H also performs parallel-to-serial conversion, conversion into differential signals, and so forth as the need arises.

Referring again to FIG. 1, the focusing screen 21, the pentaprism 22, and the eyepiece 23 constitute a viewfinder optical system in the camera main body 1. Namely, some of beams reflected off the main mirror 13 and diffused by the focusing screen 21 and out of an optical axis enter the photometric sensor 26.

The camera main body 1 also has a mount 27, a contact 28, and a connecting mechanism 29.

A mount 33 of the interchangeable lens 2 is mounted on the mount 27 of the camera main body 1.

The camera main body 1 and the interchangeable lens 2 communicate information via the contact 28 of the camera main body 1 and a contact 32 of the interchangeable lens 2.

A mounting mechanism 38 of the interchangeable lens 2 is fixed to the connecting mechanism 29 of the camera main body 1.

The interchangeable lens 2 has an optical lens group 30, a diaphragm 31, the contact 32, and the mount 33.

The optical lens group 30 and the diaphragm 31 constitute an optical system in the interchangeable lens 2.

The flash 3 has a xenon tube 34, a reflective umbrella 35, a Fresnel lens 36 for gathering light, a monitor sensor 37, and the mounting mechanism 38.

The monitor sensor 37 is a sensor for monitoring the amount of light emitted from the xenon tube 34.

Figure 4:
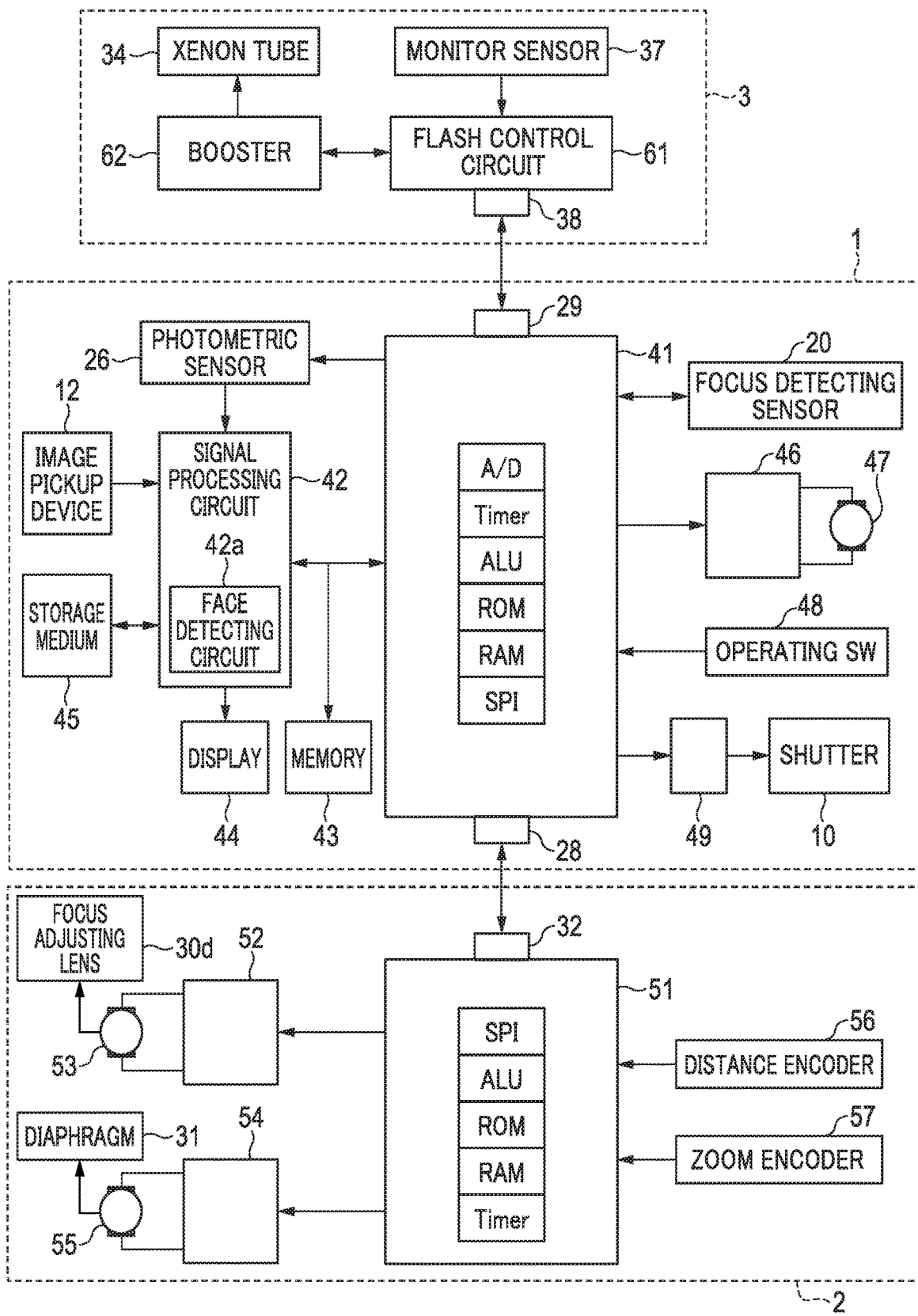
FIG. 4 is a block diagram showing arrangements of electric circuits of the camera main body, the interchangeable lens, and the flash.

FIG. 4 is a block diagram showing arrangements of electric circuits of the camera main body 1, the interchangeable lens 2, and the flash 3.

The camera main body 1 has the control circuit 41, the signal processing circuit 42, a memory 43, a display 44, and a storage medium 45.

The control circuit 41 is a control means implemented by a one-chip microcomputer that incorporates, for example, an ALU, ROM, RAM, A/D converter, timer, and serial peripheral interface (SPI), and controls the overall operation of the camera main body 1. A flow of control by the control circuit 41 will concretely be described later.

It should be noted that output signals from the focus detecting sensor 20 and the photometric sensor 26 appearing in FIG. 1 are input to an A/D converter input terminal of the control circuit 41.

The signal processing circuit 42 controls the image pickup device 12 in accordance with an instruction from the control circuit 41 to receive an image pickup signal output from the image pickup device 12 while performing analog-to-digital conversion thereof, and performs signal processing on the image pickup signal to obtain an image signal. When recording the obtained image signal in the storage medium 45, the signal processing circuit 42 performs required image processing such as compression and shading. The signal processing circuit 42 is equipped with a face detection circuit 42a that is hardware carrying out a face detecting process in which a face region (face image) of a person as a specific subject is detected from an input image. The signal processing circuit 42 also receives a signal from the photometric sensor 26 and subjects it to signal processing.

The memory 43, which is a DRAM or the like, is used as a work memory for the signal processing circuit 42 to perform various types of image processing and is also used as a VRAM when an image is displayed on the display 44, which will be described below.

The display 44, which is comprised of a liquid crystal panel or an organic EL panel, displays various types of shooting information and picked-up images and is controlled to be turned on and off in accordance with instructions from the control circuit 41. In a case where face detection is performed by the face detection circuit 42a while a live view is displayed on the display 44, the face detection result is sent from the face detection circuit 42a to the display 44. In this case, a frame indicating the face detection result is displayed in a manner being superimposed on the live view.

The storage medium 45 is comprised of a flash memory, an optical disk, or the like.

The camera main body 1 also has a first motor driver 46, a first motor 47, an operating switch member 48, and a shutter driver 49.

The first motor driver 46 is connected to an output terminal of the control circuit 41 and drives the first motor 47 under the control of the control circuit 41.

The first motor 47 flips up and down the main mirror 13 and the first reflective mirror 14 and charges the mechanical shutter 10.

The operating switch member 48 is comprised of a release switch for giving an instruction to start shooting, an operating switch for setting various modes, and so forth.

It should be noted that the contact 28 with the interchangeable lens 2 appearing in FIG. 1 is connected to signals input to and output from the serial peripheral interface of the control circuit 41 so as to enable communication with the interchangeable lens 2. Likewise, the connecting mechanism 29 for the flash 3 appearing in FIG. 1 is connected to signals input to and output from the serial peripheral interface of the control circuit 41 so as to enable communication with the flash 3.

The shutter driver 49 is connected to an output terminal of the control circuit 41 and drives the mechanical shutter 10 appearing in FIG. 1.

The interchangeable lens 2 has a lens control circuit 51, a second motor driver 52, a second motor 53, a third motor driver 54, a third motor 55, a distance encoder 56, and a zoom encoder 57.

The lens control circuit 51 is a control means implemented by a one-chip microcomputer that incorporates an ALU, ROM, RAM, A/D converter, timer, and serial peripheral interface (SPI), and so forth.

The second motor driver 52 is connected to an output terminal of the lens control circuit 51 and drives the second motor 53 under the control of the lens control circuit 51.

The second motor 53 is a motor for adjusting focus with a focus adjusting lens 30d in the optical lens group 30 of the interchangeable lens 2.

The third motor driver 54 is connected to an output terminal of the lens control circuit 51 and drives the third motor 55 under the control of the lens control circuit 51.

The third motor 55 is a motor for controlling the diaphragm 31.

The distance encoder 56 is for obtaining information on an amount by which a focus adjusting lens is extended, that is, a subject distance and is connected to an input terminal of the lens control circuit 51.

The zoom encoder 57 is for obtaining focal distance information for use in shooting when the interchangeable lens 2 is a zoom lens, and is connected to an input terminal of the lens control circuit 51.

It should be noted that the contact 32 appearing in FIG. 1 is connected to signals input to and output from the serial peripheral interface of the lens control circuit 51. Namely, when the interchangeable lens 2 is mounted on the camera main body 1, their contacts 28 and 32 are connected together, enabling the lens control circuit 51 to carry out data communications with the control circuit 41 of the camera main body 1.

Thorough such data communications, lens-specific optical information required for focus detection and exposure computation by the control circuit 41 of the camera main body 1 is output from the lens control circuit 51 to the control circuit 41 of the camera main body 1. Information on the subject distance or information on the focal distance obtained using the distance encoder 56 or the zoom encoder 57 is also output from the lens control circuit 51 to the control circuit 41 of the camera main body 1 through a data communication.

Furthermore, focus adjustment information and aperture information obtained as a result of the focus detection and the exposure computation by the control circuit 41 of the camera main body 1 are output from the control circuit 41 of the camera main body 41 to the lens control circuit 51 through a data communication. The lens control circuit 51 controls the second motor driver 52 and the third motor driver 54 in accordance with the focus adjustment information and the aperture information output from the control circuit 41 of the camera main body 1.

The flash 3 has a flash control circuit 61 and a booster 62.

The flash control circuit 61 is implemented by a one-chip microcomputer that incorporates an ALU, ROM, RAM, A/D converter, timer, serial peripheral interface (SPI), and so forth.

The booster 62 has a function of generating a high voltage of about 300 V required for the xenon tube 34 to emit light and charging with the high voltage.

It should be noted that the mounting mechanism 38 appearing in FIG. 1 is connected to signals input to and output from the serial peripheral interface of the flash control circuit 61. Namely, mounting the flash 3 on the camera main body 1 enables the flash control circuit 61 to carry out data communications with the control circuit 41 of the camera main body 1 via the connecting mechanism 29 of the camera main body 1 and the mounting mechanism 38 of the flash 3.

Thorough such data communications, the flash control unit circuit 61 causes the xenon tube 34 to start and stop emitting light by controlling the booster 62 in accordance with communications from the control circuit 41 of the camera main body 1 and also outputs the amount of light emission detected by the monitor sensor 37 to the control circuit 41 of the camera main body 1. The flash control circuit 61 is also capable of sending light emission color data on a light emission color, which varies depending on a light emitting condition such as the amount of light emission or a charging voltage at the time of light emission, to the control circuit 41 of the camera main body 1.

FIG. 5 is a view showing a list of setting items configured by a user with the operating switch member 48 or the like when taking a shot with the camera 100.

A setting item (1) is a shooting mode setting, and it has the following three groups of selectable options: people shooting modes such as a portrait mode and a child mode, non-people shooting modes such as a landscape mode and a food shooting mode, and general-purpose modes such as a program mode and an aperture priority mode in which objects to be shot are not particularly limited.

A setting item (2) is a continuous shooting speed setting, and its selectable options are a high-speed continuous shooting mode and a low-speed continuous shooting mode.

A setting item (3) is an AF mode setting, and its selectable options are a one-shot AF mode in which focusing is performed only once until a subject comes into focus and a servo AF mode in which focusing is continuously performed.

A setting item (4) is a setting as to shooting of the first frame when the AF mode is set to the servo AF mode. It has the following three selectable options: a focus priority mode in which shooting is performed after focus is achieved, a release priority mode in which shooting is immediately performed without achieving focus, and an equal priority mode in which a balance is achieved between focusing accuracy and shooting speed.

A setting item (5) is a setting as to shooting of the second and subsequent frames in continuous shooting in a case where the AF mode is set to the servo AF mode. It has the following three selectable options: a focus priority mode in which priority is given to focusing accuracy rather than continuous shooting speed, a continuous shooting speed priority mode in which priority is given to continuous shooting speed rather than focusing accuracy, and an equal priority mode in which a balance is achieved between focusing accuracy and continuous shooting speed.

A setting item (6) is a setting as to shooting in a case where the AF mode is set to the one-shot AF mode. It has the following three selectable options: a focus priority mode in which shooting is performed after focus is achieved, a release priority mode in which shooting is immediately performed without achieving focus, and an equal priority mode in which a balance is achieved between focusing accuracy and shooting speed.

A setting item (7) is a setting as to subject tracking, and its selectable options are a face tracking mode in which a human face is tracked and focused, and a non-face tracking mode in which a face is not tracked.

A concrete description will now be given of an operating sequence of a flash photography control process according to the first embodiment, which is carried out by the control circuit 41 of the camera main body 1 in accordance with a flowchart in FIG. 6.

Figure 6:
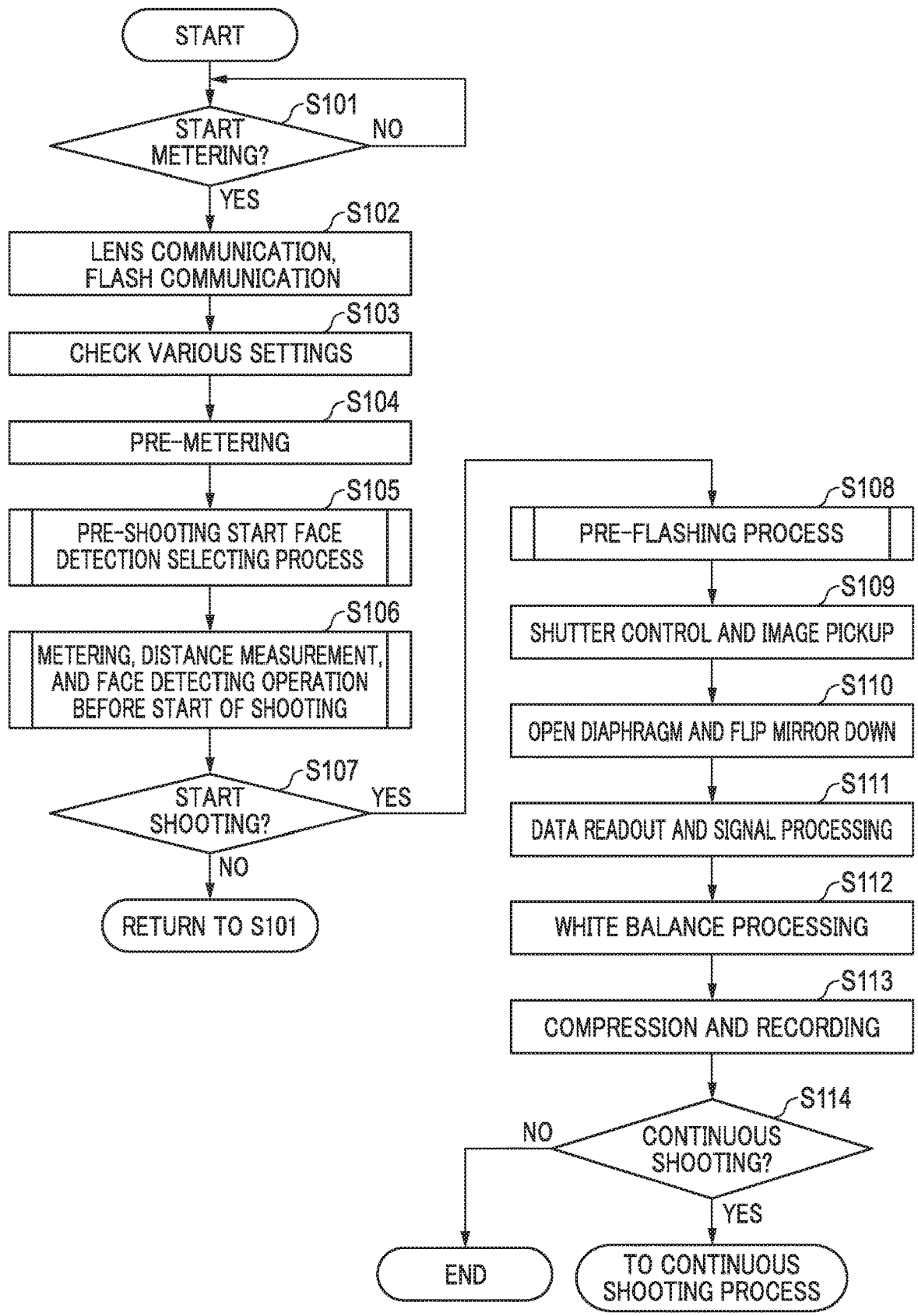
FIG. 6 is a flowchart showing the procedure of a flash photography control process according to the first embodiment of the present invention.

This flash photography control process is started in step S101 in FIG. 6 when a power switch, not shown, is turned on to enable the control circuit 41 to operate.

In the step S101, the control circuit 41 waits for metering to start in response to turning-on of the release switch of the operating switch member 48 by a first stroke. When the start of metering is detected, the process proceeds to step S102.

In the step S102, the control circuit 41 carries out a communication with the lens control circuit 51 to obtain information on the optical lens group 30 which is required for distance measurement and metering. The control circuit 41 also carries out a communication with the flash control circuit 61 to instruct the flash control circuit 61 to charge high voltage by operating the booster 62 so that a sufficient amount of light for firing a flash can be obtained, and also obtain flash-related information.

In the step S103, the control circuit 41 inputs various types of information such as the mode settings described above with reference to FIG. 5.

In the step S104, the control circuit 41 performs pre-metering. Specifically, the control circuit 41 instructs the photometric sensor 26 to perform accumulation and signal readout. In accordance with the instruction, the photometric sensor 26 accumulates electric charge for a predetermined time period and then successively inputs analog-to-digital converted signals from a plurality of pixels to the signal processing circuit 42. The signal processing circuit 42 obtains a photometric value of pre-metering for a subject (subject luminance information) by, for example, block-integrating the signals successively input from the photometric sensor 26 so that the percentages of R, G, G2, and B included in each block (array unit) of the Bayer arrangement of the pixel array 26C can be equal. The photometric value of pre-metering is used as approximate luminance information on the present subject in, for example, setting an accumulation time period in the next accumulation control.

It should be noted that the step S104 has only to be performed only in a case where the process has proceeded to the step S104 for the first time since the power switch was turned on, but once the approximate luminance information on the subject has been obtained, the step S104 may be skipped.

In the step S105, the control circuit 41 carries out a pre shooting start face detection selecting process in accordance with the various types of setting information input in the step S103. A detailed description thereof will now be given in accordance with a flowchart in FIG. 8.

Figure 8:
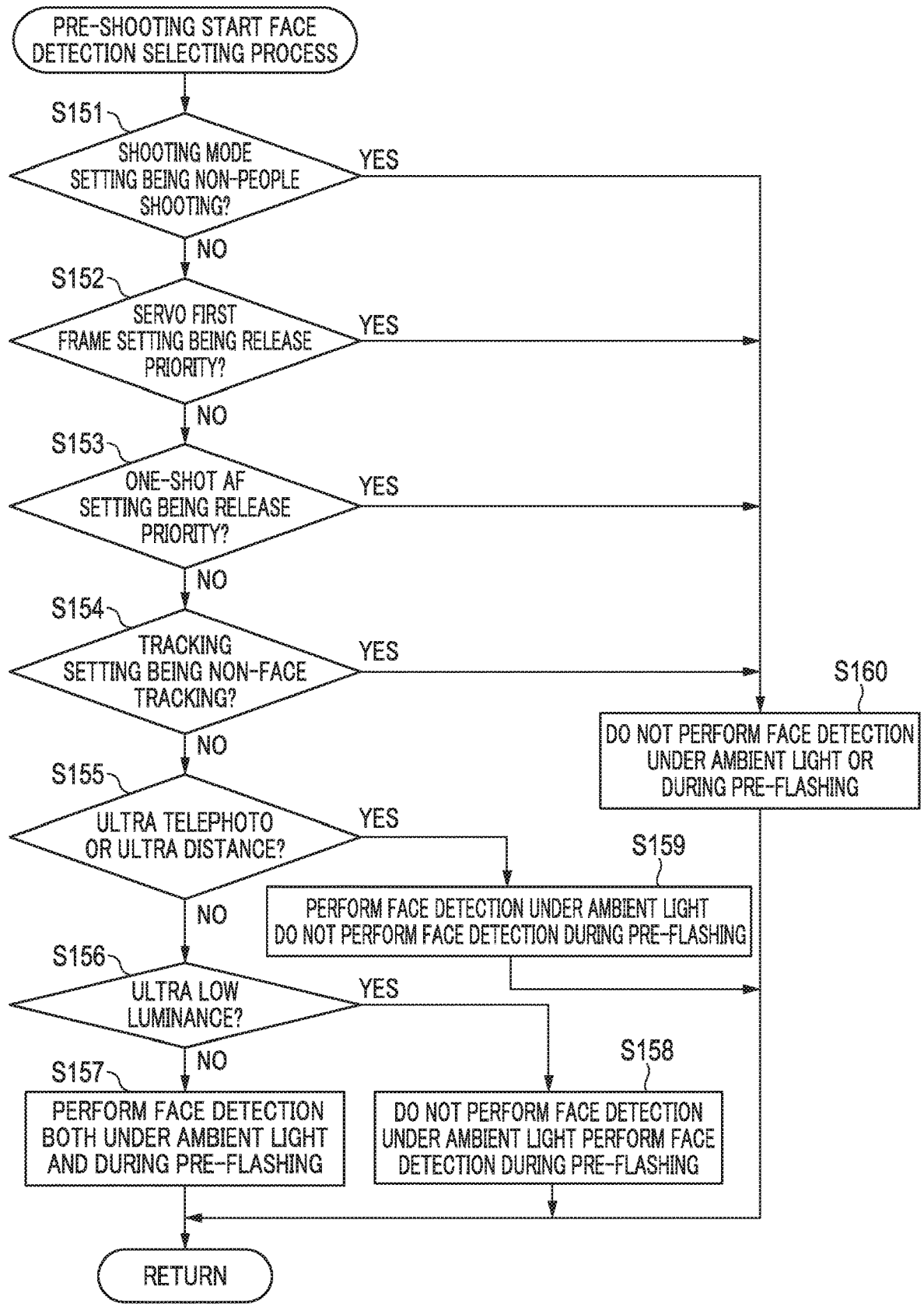
FIG. 8 is a flowchart of a pre shooting start face detection selecting process in FIG. 6.

Referring to FIG. 8, first, the control circuit 41 determines in step S151 whether or not the shooting mode is set to the non-people shooting mode. As a result of the determination, when the shooting mode is set to the non-people shooting mode, the process proceeds to step S160, and when not, the process proceeds to step S152.

In the step S152, the control circuit 41 determines whether or not the following condition is satisfied: the AF mode is set to the servo AF mode, and the setting as to shooting of the first frame in the servo AF mode is release priority. As a result of the determination, when this condition is satisfied, the process proceeds to the step S160, and when not, the process proceeds to step S153.

In the step S153, the control circuit 41 determines whether or not the following condition is satisfied: the AF mode is set to the one-shot AF mode, and the setting as to shooting in the one-shot AF mode is release priority. As a result of the determination, when this condition is satisfied, the process proceeds to the step S160, and when not, the process proceeds to step S154.

In the step S154, the control circuit 41 determines whether the face tracking mode or the non-face tracking mode is selected as the setting as to subject tracking. As a result of the determination, when the face tracking mode is selected, the process proceeds to The step S155, and when the non-face tracking mode is selected, the process proceeds to the step S160.

In the step S155, the control circuit 41 determines whether or not shooting of an ultra-distant subject is likely based on the lens information obtained in the step S102. Here, to perform this step after achieving focus, a subject distance is obtained from the distance encoder 56 of the interchangeable lens 2, and when the subject distance is longer than a threshold value set in advance, it can be determined that shooting of an ultra-distant subject is likely. On the other hand, there may be a case where this step is performed without achieving focus. In this case, an estimated shooting distance is computed based on focal length information obtained from the distance encoder 56 of the interchangeable lens 2 and a shooting magnification expected for people shooting, and when the estimated shooting distance is longer than a threshold set in advance, it can be determined that shooting of an ultra-distant subject is likely. When shooting of an ultra-distant subject is not likely, the process proceeds to step S156, and when the process proceeds to the step S155, and when shooting of an ultra-distant subject is likely, the process proceeds to step S159.

In the step S156, the control circuit 41 determines whether or not the subject luminance information obtained in the step S104 or step S106, which will be described later, indicates ultra-low luminance than a predetermined value. When the subject luminance information indicates luminance that is not very low, the process proceeds to step S157, and when the subject luminance information luminance that is very low, the process proceeds to step S158.

In the step S157, the control circuit 41 decides to perform face detection for both of an image obtained at the time of ambient light metering (image generated under ambient light) and an image obtained at the time of pre-flash metering (image generated and obtained during pre-flashing) as face detection before the start of shooting. Ambient light means no flash being fired by the flash 3. In the following description, ambient light metering will be referred to merely as ambient light, and pre-flash metering will be referred to merely as pre-flashing.

In the step S158, the control circuit 41 decides to perform face detection only for an image obtained during pre-flashing, not for an image obtained under ambient light, as face detection to be performed before the start of shooting. This is because it is difficult to detect a face from an image obtained at ultra-low luminance.

In the step S159, the control circuit 41 decides to perform face detection only for an image obtained under ambient light, not for an image obtained during pre-flashing, as face detection to be performed before the start of shooting. This is because light reflected off a subject during pre-flashing can hardly be detected when a photo of an ultra-distant subject is taken.

In the step S160, the control circuit 41 decides to perform face detection for neither an image obtained at the time of ambient light metering nor an image obtained at the time of pre-flash metering as face detection to be performed before the start of shooting. Here, the reason why the process proceeds to the step S160 in the case where it is determined in the step S151 that the shooting mode is set to the non-people shooting mode and the case where it is determined in the step S154 that the setting as to subject tracking is the non-face tracking mode is that no face detection information is needed in these cases. Also, the reason why the process proceeds to the step S160 in the case where it is determined in the step S152 that the AF mode is set to the servo AF mode, and the setting as to shooting of the first frame in the servo AF mode is release priority is that priority is given to reducing the time lag before the start of shooting rather than reducing the time period required for face detection. Likewise, the reason why the process proceeds to the step S160 in the case where it is determined in the step S153 that the AF mode is set to the one-shot AF mode, and the setting as to shooting in the one-shot AF mode is release priority is that priority is given to reducing the time lag before the start of shooting rather than reducing the time period required for face detection.

FIG. 10A is a view showing a table which is held in the storage medium 45 and used for the pre shooting start face detection selecting process in FIG. 8 described above. In FIG. 10A, for face detection under ambient light and face detection during pre-flashing under shooting-related conditions (1) to (7) such as mode setting conditions and shooting conditions for the camera 100, a case where face detection is performed is represented as 1, and a case where face detection is not performed is represented as 0.

When any of the steps S157, S158, S159, and S160 in FIG. 8 is ended to complete the pre shooting start face detection selecting process, the process proceeds to the step S106 in FIG. 6.

In the step S106, the control circuit 41 carries out a process comprised of metering, distance measurement, and face detection in accordance with a face detecting process selected in the step S105. A concrete description will now be given of operating sequences in the step S106 with reference to timing charts in FIGS. 11A and 11B.

Figure 11A:
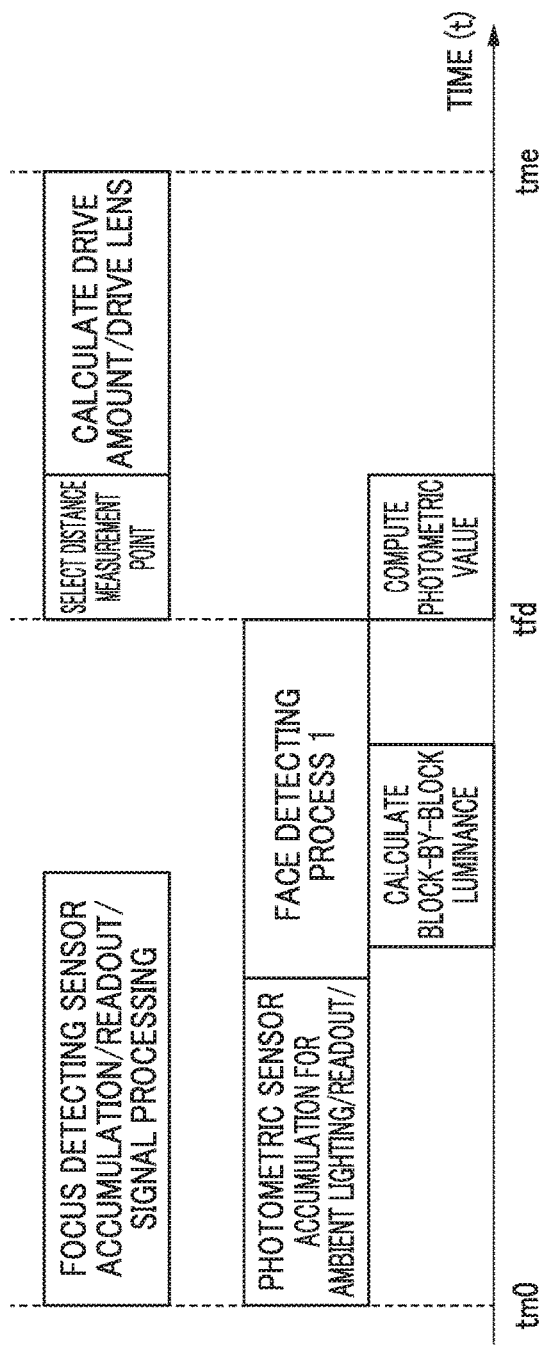
FIG. 11A is a timing chart showing an example of an operating sequence of an operating process for metering, distance measurement, and face detection before the start of shooting in FIG. 6, which is performed in a case where it is determined that face detection using an image obtained under ambient light in the pre shooting start face detection selecting process is to be performed.

When face detection using an image obtained under ambient light is selected in the step S157 or S159, the control circuit 41 performs a sequence in FIG. 11A.

In FIG. 11A, the horizontal axis represents elapsed time, and it is assumed that the process in the step S106 is started at a time tm0. Namely, at the time tm0, signal accumulation in the focus detecting sensor 20 is started, and signal accumulation in the photometric sensor 26 for ambient light metering is started as well.

After that, when signal accumulation in the focus detecting sensor 20 for a predetermined accumulation time period is completed, the control circuit 41 successively reads out accumulated signals from the focus detecting sensor 20 while performing analog-to-digital conversion thereof and outputs the resulting signals as focus detecting digital data to the signal processing circuit 42. The signal processing circuit 42 performs various types of necessary data corrections such as shading on each piece of the focus detecting digital data output from the control circuit 41.

On the other hand, when signal accumulation in the photometric sensor 26 for a predetermined accumulation time period is completed, the control circuit 41 successively reads out accumulated signals in a plurality of pixels from the photometric sensor 26 while performing analog-to-digital conversion thereof to generate digital data (image) of the plurality of pixels. The control circuit 41 (generating means) successively outputs the generated digital data to the signal processing circuit 42.

Here, the accumulation time period is determined based on a photometric value (subject luminance information) obtained in the previous accumulation or a photometric value of pre-metering (subject luminance information) obtained in the step S104.

The signal processing circuit 42 then generates an image for face detection from the digital data of the plurality of pixels output from the control circuit 41, inputs it to the face detection circuit 42a inside the signal processing circuit 42, and carries out a face detecting process 1. Specifically, the signal processing circuit 42 subjects the digital data in the Bayer arrangement to an interpolation process, generates data in colors corresponding to all of the colors RGB for each pixel, then performs addition with weighting of signal levels of the RGB data to generate the image for face detection which is comprised of a luminance signal. The signal processing circuit 42 also reads out a signal directly from the photometric sensor 26 and calculates block-by-block luminance signals of several hundred blocks from the signal that has been read out. The block-by-block luminance signals are used to obtain a photometric value for the control circuit 41 to determine a camera exposure.

After that, the control circuit 41 waits for the signal processing circuit 42 to complete the face detecting process 1.

The time at which the face detection circuit 42a completes the face detecting process 1 is a time tfd. At this time point, the signal processing circuit 42 obtains face detecting information such as a face position and a face size in a case where a face has been detected from an ambient light photometric signal as a result of the face detecting process 1 and outputs the face detecting information to the control circuit 41. Based on the face detecting information output from the signal processing circuit 42, the control circuit 41 selects a distance measurement position at which focus should be achieved and calculates an amount of lens movement for achieving focus in accordance with a focusing state at the distance measurement position based on the focus detecting digital data. The calculated amount of lens movement is then output to the control circuit 41. The lens control circuit 51 outputs a signal to the second motor driver 52 to drive the second motor 53 so that the focus adjusting lens 30d can be moved in accordance with the output amount of lens movement. As a result of this process, in a case where a face has been detected in the face detecting process 1, the interchangeable lens 2 focuses on the detected face. It should be noted that moving the focus adjusting lens 30d causes information from the distance encoder 56 to change, and hence the control circuit 41 updates information on the optical lens group 30 as well.

On the other hand, the control circuit 41 computes a photometric value for calculating a camera exposure by weighted averaging or the like with heavy weights assigned to the block-by-block luminance signals in blocks corresponding to the face position and the face size detected in the face detecting process 1 among the block-by-block luminance signals in the respective blocks calculated by the signal processing circuit 42. Based on the computed photometric value, the control circuit 41 determines an accumulation time period (that is, a shutter speed) for the image pickup device 12 and an aperture value best suited to shooting based on a predetermined program chart and a predetermined image pickup sensitivity. The determined shutter speed and aperture value are displayed on the display 44. It should be noted that in a case where one of the shutter speed and the aperture value is preset, the other one is determined so that it can achieve the optimum exposure in combination with the preset value.

The time at which the whole of the sequence described above is completed is a time tme.

Figure 11B:
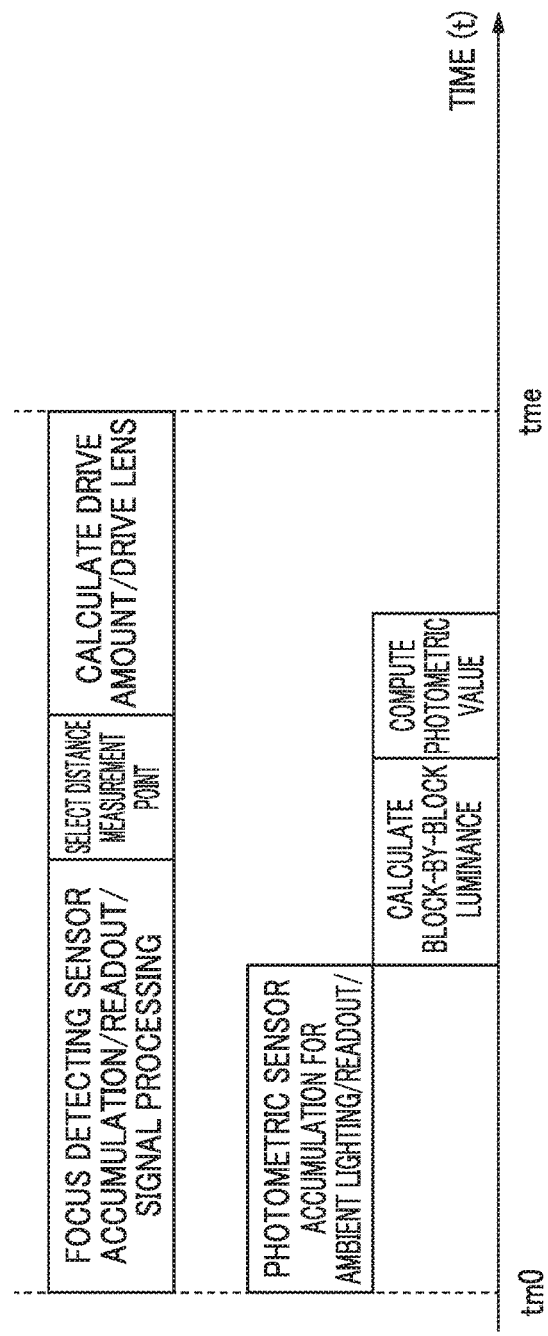
FIG. 11B is a timing chart showing an example of an operating sequence of an operating process for metering, distance measurement, and face detection before the start of shooting in FIG. 6, which is performed in a case where it is determine that face detection using an image obtained under ambient light in the pre shooting start face detection selecting process is not to be performed.

When it is determined in the step S158 or S160 that face detection using an image obtained under ambient light is not to be performed, the control circuit 41 performs a sequence in FIG. 11B.

Similarly to FIG. 11A, the horizontal axis in FIG. 11B also represents elapsed time, and it is assumed that the process in the step S106 is started at a time tm0. Namely, at the time tm0, signal accumulation in the focus detecting sensor 20 is started, and signal accumulation in the photometric sensor 26 for ambient light metering is started as well.

After that, when signal accumulation in the focus detecting sensor 20 for a predetermined accumulation time period is completed, the control circuit 41 successively reads out accumulated signals from the focus detecting sensor 20 while performing analog-to-digital conversion thereof and outputs the resulting signals as focus detecting digital data to the signal processing circuit 42. The signal processing circuit 42 performs various types of necessary data corrections such as shading on each piece of the focus detecting digital data output from the control circuit 41.

On the other hand, when signal accumulation in the photometric sensor 26 for a predetermined accumulation time period is completed, the control circuit 41 successively reads out accumulated signals in a plurality of pixels from the photometric sensor 26 while performing analog-to-digital conversion thereof and successively outputs the resulting signals as digital data of the plurality of pixels to the signal processing circuit 42.

Here, the accumulation time period is determined based on a photometric value obtained in the previous accumulation or a photometric value of pre-metering obtained in the step S104.

After that, the signal processing circuit 42 reads out signals directly from the photometric sensor 26 and calculates block-by-block luminance signals of several hundred blocks from the read-out signals so as to obtain a photometric value for use in determining a camera exposure.

The sequence in FIG. 11B differs from the sequence in FIG. 11A in that face detection is not performed. Thus, immediacy after completing the various data corrections on each piece of focus detecting digital data, the control circuit 41 selects a distance measurement position at which focus should be achieved. After that, the control circuit 41 calculates an amount of lens movement for achieving focus in accordance with a focusing state at the distance measurement position based on the focus detecting digital data. It should be noted that the distance measurement position at which focus should be achieved may be designated in advance using the operating switch member 48. The calculated amount of lens movement is then output to the control circuit 41. The lens control circuit 51 outputs a signal to the second motor driver 52 to drive the second motor 53 so that the focus adjusting lens 30d can be moved in accordance with the output amount of lens movement. It should be noted that moving the focus adjusting lens 30d causes information from the distance encoder 56 to change, and hence the control circuit 41 updates information on the optical lens group 30 as well.

On the other hand, in accordance with a predetermined algorithm, the control circuit 41 computes a photometric value for calculating a camera exposure by weighted averaging or the like on the block-by-block luminance signals in the respective blocks calculated by the signal processing circuit 42. Based on the computed photometric value, the control circuit 41 determines an accumulation time period (that is, a shutter speed) for the image pickup device 12 and an aperture value best suited to shooting based on a predetermined program chart and a predetermined image pickup sensitivity. The determined shutter speed and aperture value are displayed on the display 44. It should be noted that in a case where one of the shutter speed and the aperture value is preset, the other one is determined so that it can achieve the optimum exposure in combination with the preset value.

The time at which the whole of the sequence described above is completed is a time tme, but as compared to the sequence in FIG. 11A in which the face detecting process 1 is carried out, the time period from the time tm0 to the time tme is short in the sequence 11B in which the face detecting process 1 is not carried out.

It should be noted that in both of the sequences in FIGS. 11A and 11B, when the AF mode is set to the one-shot AF mode, the operation from the signal accumulation in the focus detecting sensor 20 to the movement of the focus adjusting lens 30d, that is, the operation illustrated in the upper row in each figure is performed only once before focus is achieved.

When the sequence in FIG. 11A or 11B is completed, the process proceeds to step S107 in FIG. 6 referred to here again, in which it is determined whether or not the release switch of the operating switch member 48 has been turned on. When the release switch of the operating switch member 48 has not been turned on, the process returns to the step S101, and when the release switch of the operating switch member 48 has been turned on, the process proceeds to step S108.

In the step S108, a pre-flashing process is carried out. Also, based on a result of selection as to face detection in the pre shooting start face detection selecting process in the step S105, not only metering but also face detection is carried out as the need arises. A concrete description will now be given of an operating sequence in the step S108 with reference to timing charts in FIGS. 12A, 12B and 12C.

Figure 12A:
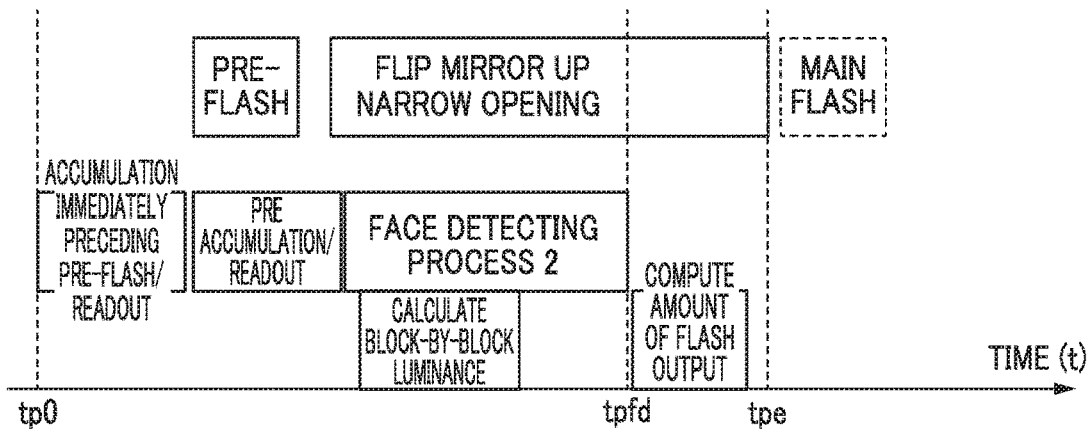
FIG. 12A is a timing chart showing an example of an operating sequence of an operating process for metering and face detection at the time of pre-flashing in FIG. 6, which is performed in a case where face detection using an image obtained during pre-flashing in the pre shooting start face detection selecting process is performed without waiting for completion of a face detecting process in FIG. 11A.

When face detection using an image obtained under ambient light is selected in the step S157 or S158, the control circuit 41 performs a sequence in FIG. 12A.

In FIG. 12A, the horizontal axis represents elapsed time, and it is assumed that the process in the step S108 is started at a time tp0. Namely, at the time tp0, signal accumulation in the photometric sensor 26 for metering immediately before pre-flashing is started.

After that, when signal accumulation in the photometric sensor 26 for a predetermined accumulation time period is completed, the control circuit 41 successively reads out accumulated signals in a plurality of pixels from the photometric sensor 26 while performing analog-to-digital conversion thereof and successively outputs the resulting signals as digital data of the plurality of pixels to signal processing circuit 42.

Then, the control circuit 41 gives a pre-flashing instruction to the flash control circuit 61 so as to perform metering during pre-flashing and also starts signal accumulation in the photometric sensor 26 for metering during pre-flashing. In accordance with this pre-flashing instruction, the flash control circuit 61 causes the xenon tube 34 to emit light based on an output signal from the monitor sensor 36 such that the amount of light emitted by the xenon tube 34 during pre-flashing can be equal to an amount determined in advance. On this occasion, the photometric sensor 26 performs signal accumulation suitable for a subject luminance during pre-flashing. The control circuit 41 performs successively reads out accumulated signals in a plurality of pixels from the photometric sensor 26 while performing analog-to-digital conversion thereof and successively outputs the resulting signals as digital data of the plurality of pixels to signal processing circuit 42.

When the pre-flashing is completed, the control circuit 41 outputs a control signal to the first motor driver 46, which in turn drives the first motor 47 to flip up the main mirror 13 and the first reflective mirror 14. Then, the control circuit 41 outputs aperture value information computed in the step S106 to the control circuit 51. In accordance with the aperture value information output from the control circuit 41, the lens control circuit 51 outputs a signal indicative of an instruction to actuate the diaphragm 31 to the third motor driver 54, causing the third motor 55 to run. This brings the interchangeable lens 2 into an aperture-narrowed state.

In parallel with the mirror flipping-up and aperture narrowing operations, the signal processing circuit 42 generates an image for face detection from the digital data of the plurality of pixels output from the control circuit 41 during pre-flashing and inputs it to the face detection circuit 42*a* inside the signal processing circuit 42 to carry out a face detecting process 2. The signal processing circuit 42 reads out an immediately-preceding light emission photometric signal and a pre-flashing photometric signal directly from the photometric sensor 26 and calculates block-by-block pre-flashing luminance signals of several hundred blocks from those signals that have been read out. The block-by-block pre-flashing luminance signals are used for the control circuit 41 to obtain a photometric value based on pre-flash components in the respective blocks of the subject for use in determining the amount of main flash output by the flash 3 in flash photography.

After that, the control circuit 41 waits for the signal processing circuit 42 to complete the face detecting process 2.

The time at which the face detection circuit 42*a* completes the face detecting process 2 is a time tpfd. At this time point, the signal processing circuit 42 obtains face detecting information such as a face position and a face size in a case where a face has been detected from a pre-flashing photometric signal as a result of the face detecting process 2 and outputs the face detecting information to the control circuit 41.

The control circuit 41 computes the amount of main flash output by weighted averaging or the like with heavy weights assigned to the block-by-block pre-flashing luminance signals in blocks corresponding to the face position and the face size detected in the face detecting process 2 among the block-by-block pre-flashing luminance signals in the respective blocks calculated by the signal processing circuit 42.

Figure 12B:
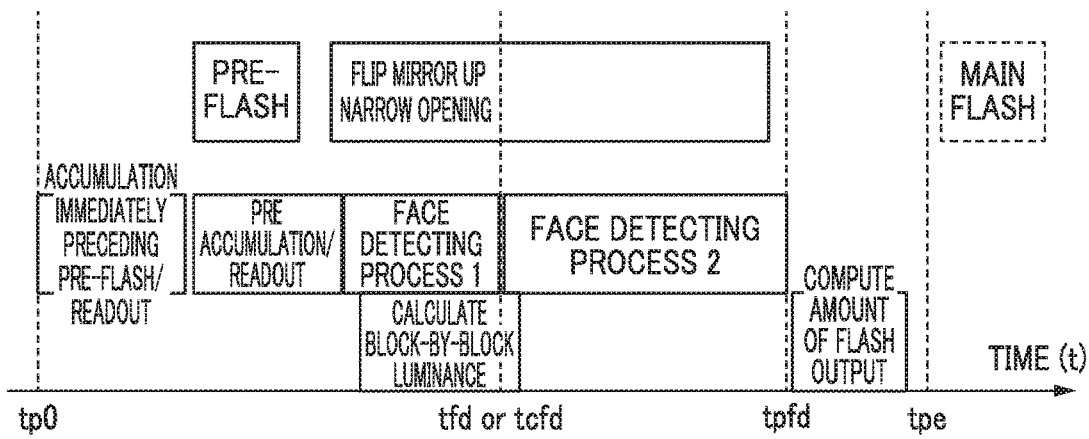
FIG. 12B is a timing chart showing an example of an operating sequence of an operating process for metering and face detection at the time of pre-flashing in FIG. 6, which is performed in a case where face detection using an image obtained during pre-flashing in the pre shooting start face detection selecting process is performed after completion of a face detecting process in FIG. 11A.

It should be noted that the sequence illustrated in FIG. 12A is performed in a case where the face detection circuit 42*a* inside the signal processing circuit 42 is not carrying out the face detecting process 1 at the time point when the generation of the image for face detection from the digital data of the plurality of pixels obtained at the time of pre-flashing is completed. In a case where, for example, the face detecting process 1 under ambient light described with reference to FIG. 11A has not been completed yet, the face detecting process 2 at the time of pre-flashing can be carried out after the face detecting process 1 is completed, and hence a sequence illustrated in FIG. 12B is performed. In the sequence illustrated in FIG. 12B, the time tpe at which the whole of the sequence is completed is later than in the sequence illustrated in FIG. 12A because the time tpfd at which the face detecting process 42*a* completes the face detecting process 2 is later than in the sequence illustrated in FIG. 12A.

Figure 12C:
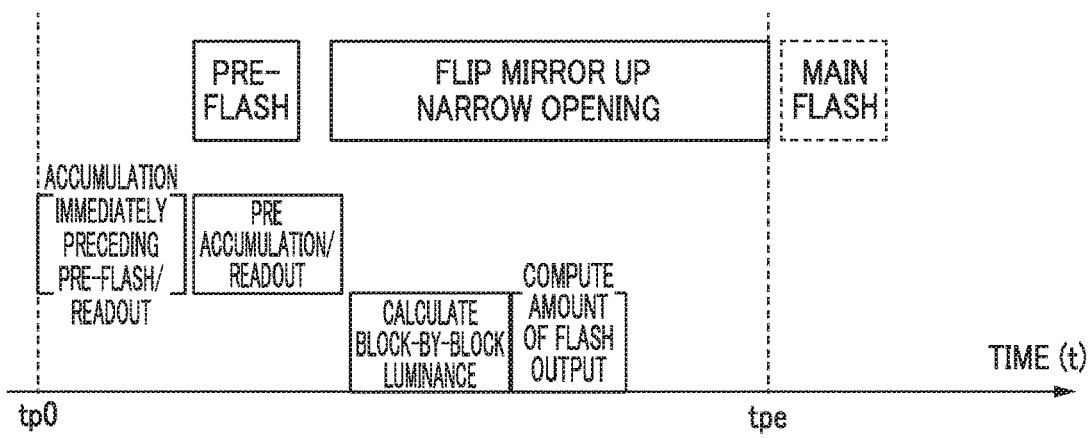
FIG. 12C is a timing chart showing an example of an operating sequence of an operating process for metering and face detection during pre-flashing in FIG. 6, which is performed in a case where it is determine that face detection using an image obtained during pre-flashing in the pre shooting start face detection selecting process is not to be performed.

When it is determined in the step S159 or S160 that face detection using an image obtained during pre-flashing is not to be performed, the control circuit 41 performs a sequence in FIG. 12C.

Similarly to FIG. 12A, the horizontal axis in FIG. 12C also represents elapsed time, and it is assumed that the process in the step S108 is started at a time tp0. Namely, at the time tp0, signal accumulation in the photometric sensor 26 for metering immediately preceding pre-flashing is started as well.

After that, when signal accumulation in the photometric sensor 26 for a predetermined accumulation time period is completed, the control circuit 41 successively reads out accumulated signals in a plurality of pixels from the photometric sensor 26 while performing analog-to-digital conversion thereof and successively outputs the resulting signals as digital data of the plurality of pixels to the signal processing circuit 42.

Then, the control circuit 41 gives a pre-flashing instruction to the flash control circuit 61 so as to perform pre-flash metering and also starts signal accumulation in the photometric sensor 26 for pre-flash metering. In accordance with this pre-flashing instruction, the flash control circuit 61 causes the xenon tube 34 to emit light based on an output signal from the monitor sensor 36 such that the amount of flash output can be equal to an amount determined in advance. On this occasion, the photometric sensor 26 performs signal accumulation suitable for a subject luminance at the time of pre-flashing. The control circuit 41 successively reads out accumulated signals of a plurality of pixels from the photometric sensor 26 while performing analog-to-digital conversion thereof and successively outputs the resulting signals as digital data of the plurality of pixels to signal processing circuit 42.

When the pre-flashing is completed, the control circuit 41 outputs a control signal to the first motor driver 46, which in turn drives the first motor 47 to flip up the main mirror 13 and the first reflective mirror 14. Then, the control circuit 41 outputs aperture value information computed in the step S106 to the control circuit 51. In accordance with the aperture value information output from the control circuit 41, the lens control circuit 51 outputs a signal indicative of an instruction to actuate the diaphragm 31 to the third motor driver 54, causing the third motor 55 to run. This brings the interchangeable lens 2 into an aperture-narrowed state.

In parallel with the mirror flipping-up and aperture narrowing operations, the signal processing circuit 42 reads out an immediately-preceding light emission photometric signal and a pre-flashing photometric signal directly from the photometric sensor 26 and calculates block-by-block pre-flashing luminance signals of several hundred blocks from those signals. The block-by-block pre-flashing luminance signals are used to obtain a photometric value for the control circuit 41 to obtain a photometric value based on pre-flash components in the respective blocks of the subject for use in determining the amount of main flash output by the flash 3 in flash photography.

In accordance with a predetermined algorithm, the control circuit 41 computes the amount of light emitted in main flashing by weighted averaging or the like on the block-by-block pre-flashing luminance signals in the respective blocks calculated by the signal processing circuit 42. It should be noted that there may be a case where information such as a face position has been obtained by face detection from a photometric signal under ambient light in the step S106 or step S124 in FIG. 7, which will be described later. In this case, the control circuit 41 computes the amount of light emitted in main flashing by weighted averaging or the like with heavy weights assigned to the block-by-block pre-flashing luminance signals in blocks corresponding to the detected face position and face size.

The time at which the whole of the sequence described above is completed is a time tpe, but in the sequence 11C in which the face detecting process 1 is not carried out, the time period from the time tp0 to the time tpe is equal to or shorter than in the sequence in FIG. 12A in which the face detecting process 2 is carried out.

When the sequence in FIG. 12A, 12B, or 12C is completed, the process proceeds to step S109 in FIG. 6 referred to here again, in which the control circuit 41 outputs a signal to the shutter driver 49, causing the mechanical shutter 10 to open. As a result, a light beam from the interchangeable lens 2 enters the image pickup device 12 to enable image pickup. After that, the control circuit 41 gives an instruction to the signal processing circuit 42 so that signal accumulation in the image pickup device 12 can be performed for an accumulation time period according to a shutter time period computed in the step S106 and at a gain appropriate to a predetermined image pickup sensitivity. In synchronization with this image pickup timing, the control circuit 41 gives a flash firing instruction to the flash control circuit 61. In accordance with the flash firing instruction, the flash control circuit 61 causes the xenon tube 34 to emit light based on an output signal from the monitor sensor 37 such that the amount of flash output can be equal to the amount calculated in the step S108. As a result, an image is picked up with a flash fired.

When the image pickup is completed, a signal is output to the shutter driver 49, bringing the mechanical shutter 10 into a light-shielding state. As a result, the image pickup device 12 is shielded from a light beam from the interchangeable lens 2.

In step S110, the control circuit 41 outputs information to the lens control circuit 51 so as to open the diaphragm 31. In accordance with this information, the lens control circuit 51 outputs a signal to the third motor driver 54, which in turn runs the third motor 55 to drive the diaphragm 3. This brings the interchangeable lens 2 into an aperture-opened state. The lens control circuit 41 also outputs a control signal to the first motor driver 46, which in turn runs the first motor 47 to flip down the main mirror 13 and the first reflective mirror 14.

In step S111, the control circuit 41 successively reads out picked-up image information from the image pickup device 12 while performing analog-to-digital conversion thereof and instructs the signal processing circuit 42 to carry out a correction process and an interpolation process that are required.

In step S112, the control circuit 41 instructs the signal processing circuit 42 to make a white balance adjustment on the picked-up image information. Specifically, in the picked-up image information, a screen is divided into a plurality of areas, and white areas of a subject are extracted from color differential signals in the respective areas. Further, based on the signals in the extracted area, red-channel and blue-channel blue gain correction is performed for the entire screen to make the white balance adjustment.

In step S113, the control circuit 41 instructs the signal processing circuit 42 to compress the picked-up image information, which has been subjected to the white balance adjustment, into a recording file format and store it in the storage medium 45.

In step S114, the control circuit 41 determines whether or not the camera 100 is placed in the continuous shooting mode, and the release switch of the operating switch member 48 is still on. When the camera 100 is placed in the continuous shooting mode, and the release switch of the operating switch member 48 is still on, the control circuit 41 starts a continuous shooting process, which will be described later with reference to FIG. 7, so as to carry out a continuous shooting process, and when not, the control circuit 41 ends the present process.

Figure 7:
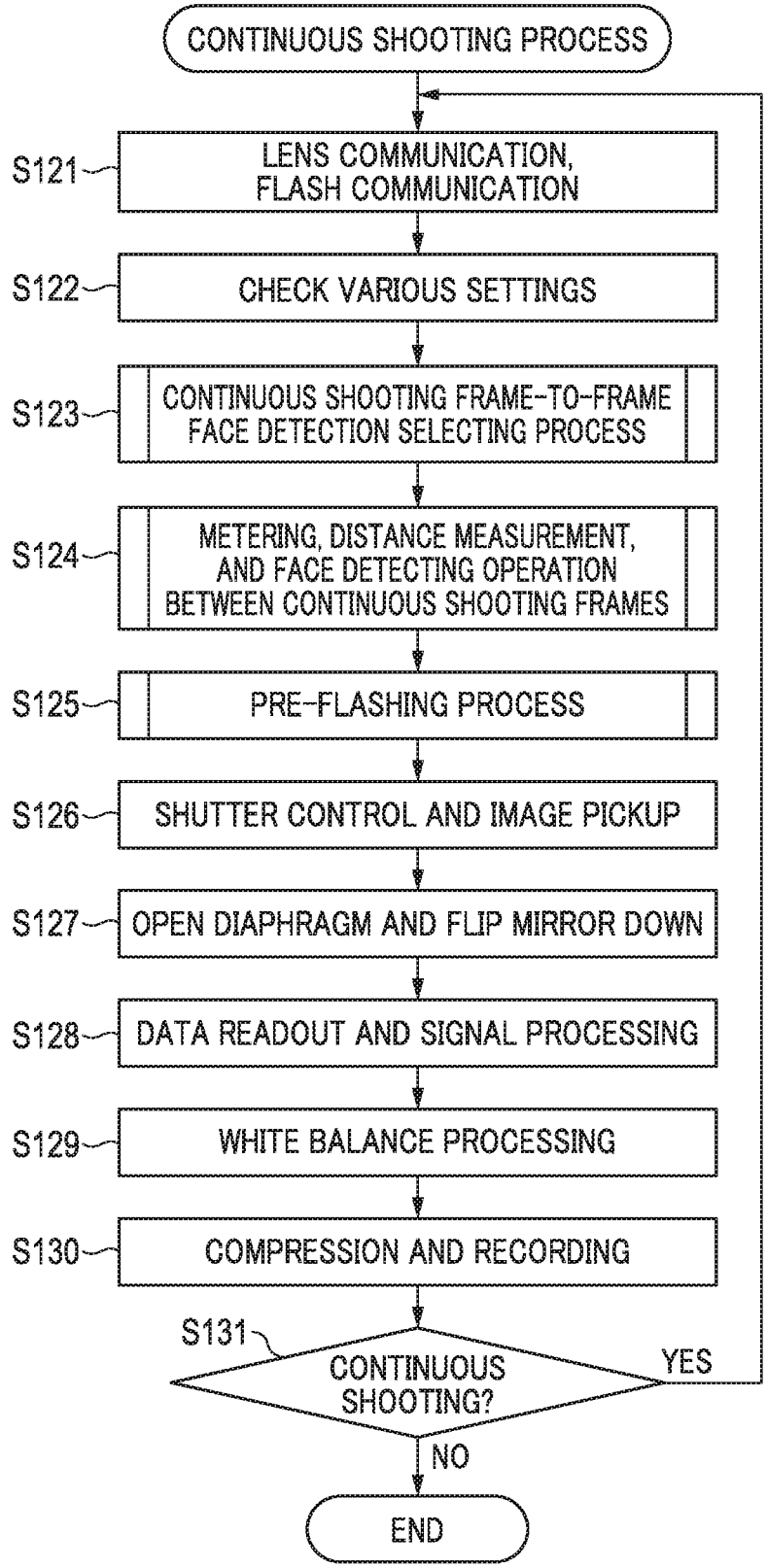
FIG. 7 is a continued part of the flowchart in FIG. 6.

In the continuous shooting process in FIG. 7, first, in step S121, the control circuit 41 carries out a communication with the lens control circuit 51 to update information on the optical lens group 30 which is required for distance measurement and metering. The control circuit 41 also carries out a communication with the flash control circuit 61 to update information on the flash 3 as well.

In step S122, the control circuit 41 inputs various types of setting information such as the mode settings described earlier with reference to FIG. 5.

In step S123, the control circuit 41 carries out a continuous frame-to-frame face detection selecting process according to the setting information input in the step S122. A detailed description thereof will now be given with reference to a flowchart in FIG. 9.

Figure 9:
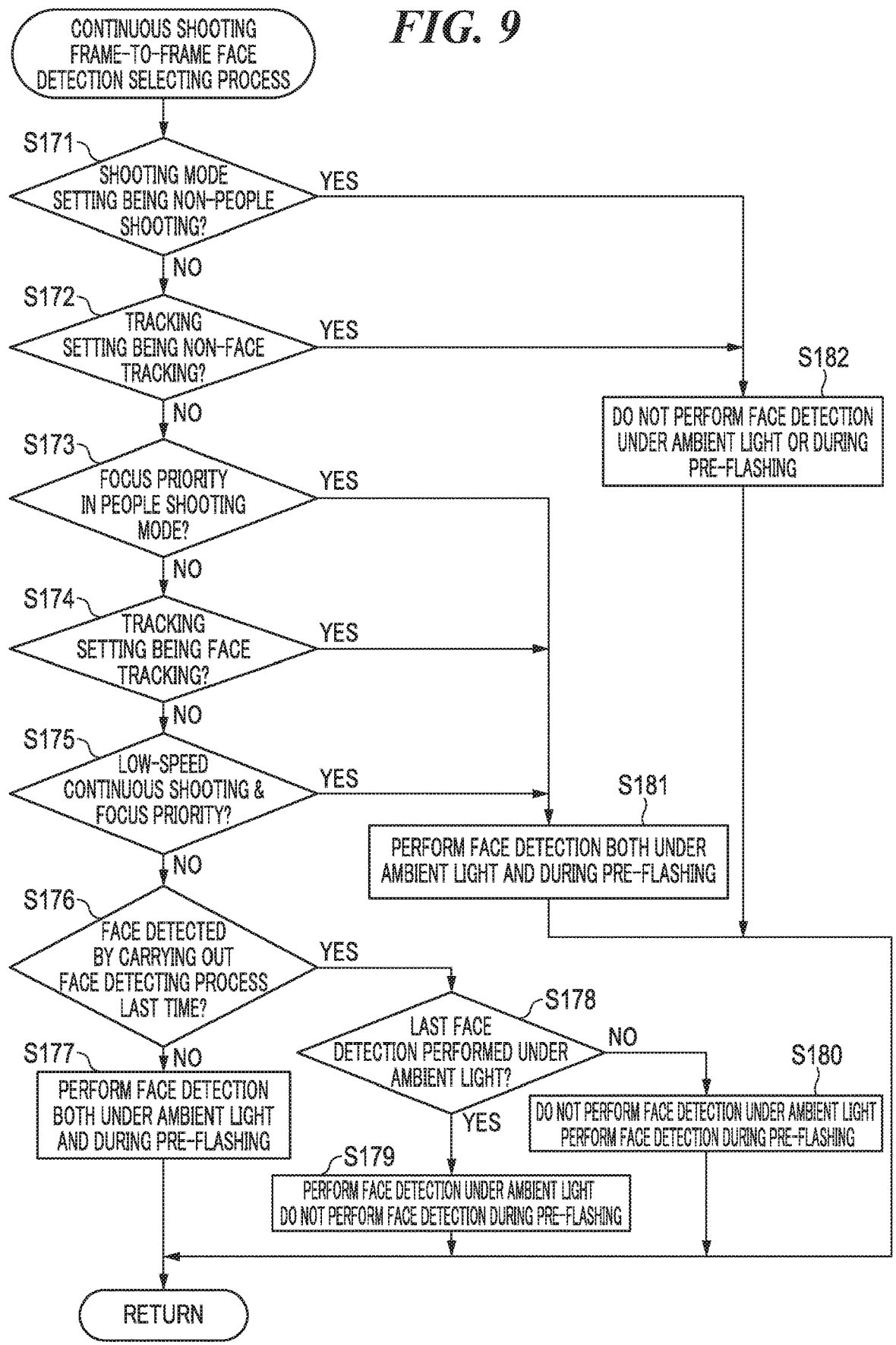
FIG. 9 is a flowchart of a continuous shooting frame-to-frame face detection selection process in FIG. 7.

Referring to FIG. 9, first, the control circuit 41 determines in step S171 whether or not the shooting mode is set to the non-people shooting mode. As a result of the determination, when the shooting mode is set to the non-people shooting mode, the process proceeds to step S182, and when not, the process proceeds to step S172.

In the step S172, the control circuit 41 determines whether the setting as to subject tracking is the face tracking mode or the non-face tracking mode. As a result of the determination, when the setting as to subject tracking is the face tracking mode, the process proceeds to step S173, and when not, the process proceeds to the step S182.

In the step S173, the control circuit 41 determines whether or not the following condition is satisfied: the shooting mode is set to the people shooting mode, the AF mode is set to the servo AF mode, and the setting for shooting of the second and subsequent frames in continuous shooting is focus priority. As a result of the determination, when the condition is satisfied, the process proceeds to step S181, and when not, the process proceeds to step S174.

In the step S174, the control circuit 41 determines whether or not the following condition is satisfied: the setting as to subject tracking is the face tracking mode, the AF mode is set to the servo AF mode, and the setting for shooting of the second and subsequent frames in continuous shooting is focus priority. As a result of the determination, when the condition is satisfied, the process proceeds to the step S181, and when not, the process proceeds to step S175.

In the step S175, the control circuit 41 determines whether or not the following condition is satisfied: the continuous shooting speed setting is the low-speed continuous shooting mode, the AF mode setting is the servo AF mode, and the setting for shooting of the second and subsequent frames in continuous shooting is focus priority. As a result of the determination, when the condition is satisfied, the process proceeds to the step S181, and when not, the process proceeds to step S176.

In the step S176, the control circuit 41 determines whether or not a face could be detected by carrying out a face detecting process in the latest metering process step, that is, the step S106 in FIG. 6 described earlier, or in step S124 in FIG. 7, which will be described later, before the process proceeded to the present step. As a result of the determination, when a face could be detected by carrying out the face detecting process in the latest metering process step, the process proceeds to step S178. On the other hand, when no face could be detected although the face detecting process was carried out in the latest metering process step, the process proceeds to step S177.

In the step S177, the control circuit 41 decides to perform face detection for both of an image obtained under ambient light and an image obtained during pre-flashing as face detection to be performed between frames in continuous shooting. This is because the process proceeding to the step S177 means that no face could be detected before the start of shooting or during continuous shooting although face detection was required.

In the step S178, the control circuit 41 determines whether in the latest metering process step, the face could be detected from an image obtained under ambient light or an image obtained during pre-flashing. When in the latest metering process step, the face could be detected from the image obtained under ambient light, the process proceeds to step S179. On the other hand, when in the latest metering process step, the face could be detected from the image obtained during pre-flashing, the process proceeds to step S180.

In the step S179, the control circuit 41 decides to perform face detection only for an image obtained under ambient light, as face detection to be performed between frames in continuous shooting and not to perform face detection for an image obtained during pre-flashing. Namely, the time required for face detection can be reduced to a minimum by selecting only an image obtained under ambient light, for which face detection could be performed in the latest metering process step, for face detection to be performed between frames.

In the step S180, the control circuit 41 decides to perform face detection only for an image obtained during pre-flashing as face detection to be performed between frames in continuous shooting and not to perform face detection for an image obtained under ambient light. Namely, the time required for face detection can be reduced to a minimum by selecting only an image obtained during pre-flashing, for which face detection could be performed in the latest metering process step, for face detection to be performed between frames.

In step S181, the control circuit 41 chooses to perform face detection for both an image obtained under ambient light and an image obtained during pre-flashing as face detection to be performed between frames in continuous shooting.

In the step S182, the control circuit 41 decides to perform face detection for neither an image obtained under ambient light nor an image obtained during pre-flashing as face detection to be performed between frames in continuous shooting.

FIG. 10B shows a table which is held in the storage medium 45 and used for the continuous shooting frame-to-frame face detection selecting process in FIG. 9 described above. In FIG. 10B, for face detection under ambient light and face detection during pre-flashing under shooting-related conditions (1) to (8) such as mode setting conditions and shooting conditions, a case where face detection is performed is represented as 1, and a case where face detection is not performed is represented as 0.

When any of the steps S177, S179, S180, and S181 in FIG. 8 is ended to complete the continuous shooting frame-to-frame face detection selecting process, the process proceeds to the step S124 in FIG. 7.

In the step S124, the control circuit 41 carries out a process comprised of metering, distance measurement, and face detection between continuous shooting frames in accordance with a face detecting process selected in the step S123. A concrete description will now be given of operating sequences in the step S124 with reference to timing charts in FIGS. 13A and 13B.

Figure 13A:
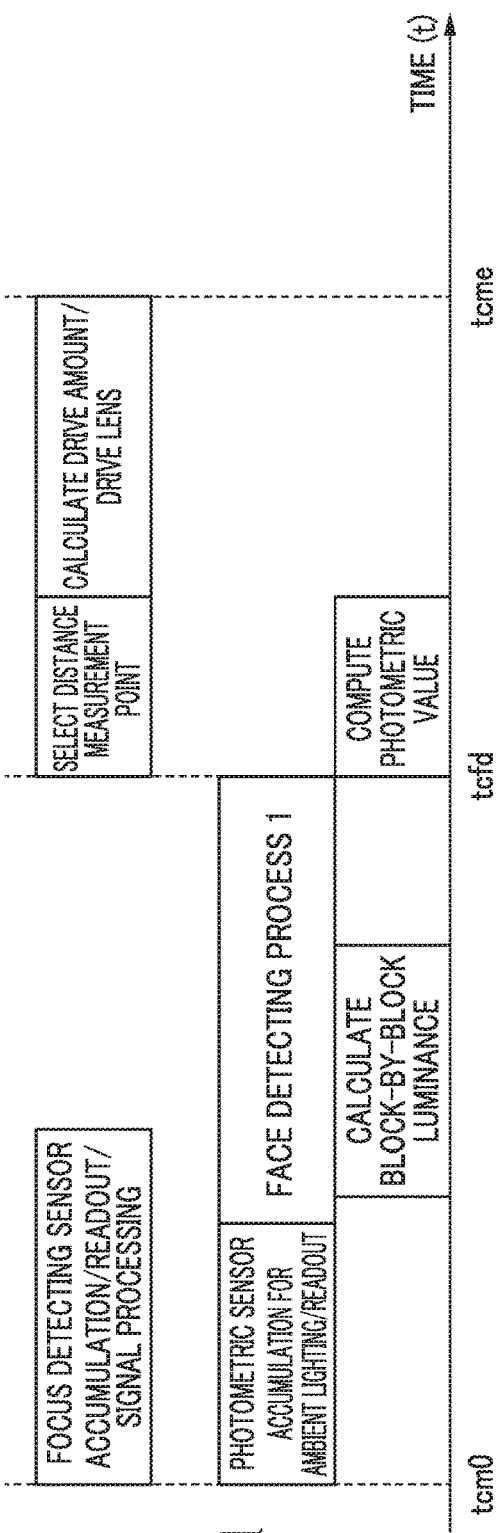
FIG. 13A is a timing chart showing an example of an operating sequence of an operating process for metering, distance measurement, and face detection between continuous shooting frames in FIG. 7, which is performed in a case where it is determine that face detection using an image obtained under ambient light in the continuous shooting frame-to-frame face detection selecting process is to be performed.

When it is determined in the step S177, S179, or S181 that face detection using an image obtained under ambient light is to be performed, the control circuit 41 performs the sequence in FIG. 13A.

In FIG. 13A, the horizontal axis represents elapsed time, and it is assumed that the process in the step S124 is started at a time tcm0. Namely, at the time tcm0, signal accumulation in the focus detecting sensor 20 is started, and signal accumulation in the photometric sensor 26 for ambient light metering is started as well.

After that, when signal accumulation in the focus detecting sensor 20 for a predetermined accumulation time period is completed, the control circuit 41 successively reads out accumulated signals from the focus detecting sensor 20 while performing analog-to-digital conversion thereof and outputs the resulting signals as focus detecting digital data to the signal processing circuit 42. The signal processing circuit 42 performs various types of necessary data corrections such as shading on each piece of the focus detecting digital data output from the control circuit 41.

On the other hand, when signal accumulation in the photometric sensor 26 for a predetermined accumulation time period is completed, the control circuit 41 successively reads out accumulated signals of a plurality of pixels from the photometric sensor 26 while performing analog-to-digital conversion thereof to generate digital data of the plurality of pixels. The control circuit 41 successively outputs the generated digital data to the signal processing circuit 42.

Here, the accumulation time period is determined based on a photometric value obtained in the previous accumulation, but in the sequence between continuous shooting frames, there may be a case where the time period required for signal accumulation in the focus detecting sensor 20 and the photometric sensor 26 is limited to a shorter time period than in the sequence before the start of shooting so as to maintain continuous shooting speed.

The signal processing circuit 42 then generates an image for face detection from the digital data of the plurality of pixels output from the control circuit 41, inputs it to the face detection circuit 42a inside the signal processing circuit 42, and carries out the face detecting process 1. Specifically, the signal processing circuit 42 reads out a signal directly from the photometric sensor 26 and calculates block-by-block luminance signals of several hundred blocks from the signal that has been read out. The block-by-block luminance signals are used to obtain a photometric value for the control circuit 41 to determine a camera exposure.

After that, the control circuit 41 waits for the signal processing circuit 42 to complete the face detecting process 1.

The time at which the face detection circuit 42a completes the face detecting process 1 is a time tcfd. At this time point, the signal processing circuit 42 obtains face detecting information such as a face position and a face size in a case where a face has been detected from an ambient light photometric signal as a result of the face detecting process 1 and outputs the obtained face detecting information to the control circuit 41. Based on the face detecting information output from the signal processing circuit 42, the control circuit 41 selects a distance measurement position at which focus should be achieved and calculates an amount of lens movement for achieving focus in accordance with a focusing state at the distance measurement position based on the focus detecting digital data. The calculated amount of lens movement is then output to the control circuit 41. The lens control circuit 51 outputs a signal to the second motor driver 52 to drive the second motor 53 so that the focus adjusting lens 30d can be moved in accordance with the output amount of lens movement. As a result of this process, in a case where a face has been detected in the face detecting process 1, the interchangeable lens 2 focuses on the detected face. It should be noted that moving the focus adjusting lens 30d causes information from the distance encoder 56 to change, and hence the control circuit 41 updates information on the optical lens group 30 as well.

On the other hand, the control circuit 41 computes a photometric value for calculating a camera exposure by weighted averaging or the like with heavy weights assigned to the block-by-block luminance signals in blocks corresponding to the face position and the face size detected in the face detecting process 1 among the block-by-block luminance signals in the respective blocks calculated by the signal processing circuit 42. Based on the computed photometric value, the control circuit 41 determines an accumulation time period (that is, a shutter speed) for the image pickup device 12 and an aperture value best suited to shooting based on a predetermined program chart and a predetermined image pickup sensitivity. The determined shutter speed and the aperture value are displayed on the display 44. It should be noted that in a case where one of the shutter speed and the aperture value is preset, the other one is determined so that it can achieve the optimum exposure in combination with the preset value.

The time at which the whole of the sequence described above is completed is a time tcme.

Figure 13B:
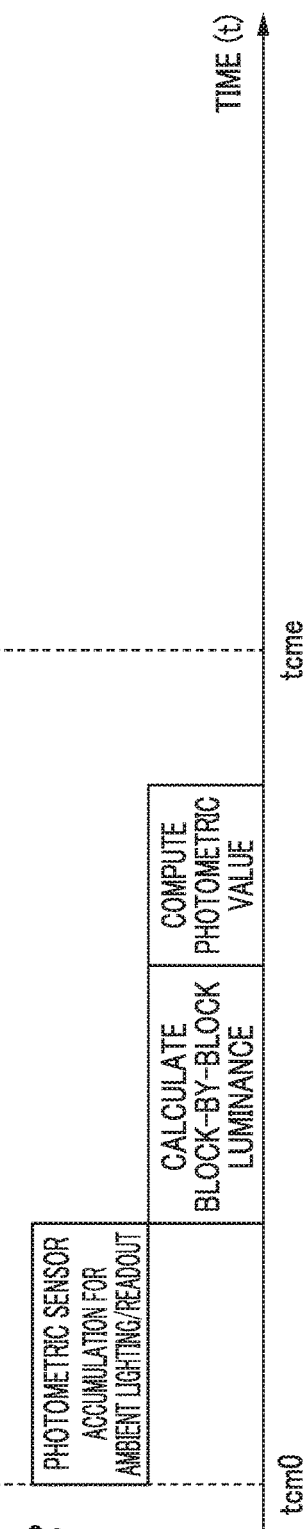
FIG. 13B is a timing chart showing an example of an operating sequence of an operating process for metering, distance measurement, and face detection between continuous shooting frames in FIG. 7, which is performed in a case where it is determine that face detection using an image obtained under ambient light in the continuous shooting frame-to-frame face detection selecting process is not to be performed.

When it is determined in the step S180 or S182 that face detection using an image obtained under ambient light is not to be performed, the control circuit 41 performs a sequence in FIG. 13B.

Similarly to FIG. 13A, the horizontal axis in FIG. 13B also represents elapsed time, and it is assumed that the process in the step S124 is started at a time tcm0. Namely, at the time tcm0, signal accumulation in the focus detecting sensor 20 is started, and signal accumulation in the photometric sensor 26 for ambient light metering is started as well.

After that, when signal accumulation in the focus detecting sensor 20 for a predetermined accumulation time period is completed, the control circuit 41 performs successively reads out accumulated signals from the focus detecting sensor 20 while performing analog-to-digital conversion thereof and outputs the resulting signals as focus detecting digital data to the signal processing circuit 42. The signal processing circuit 42 performs various types of necessary data corrections such as shading on each piece of the focus detecting digital data output from the control circuit 41.

On the other hand, when signal accumulation in the photometric sensor 26 for a predetermined accumulation time period is completed, the control circuit 41 successively reads out accumulated signals of a plurality of pixels from the photometric sensor 26 while performing analog-to-digital conversion thereof and successively outputs the signals as digital data of the plurality of pixels to the signal processing circuit 42.

Here, the accumulation time period is determined based on a photometric value obtained in the previous accumulation, but in the sequence between continuous shooting frames, there may be a case where the time period required for signal accumulation in the focus detecting sensor 20 and the photometric sensor 26 is limited to a shorter time period than in the sequence before the start of shooting so as to maintain continuous shooting speed.

After that, the signal processing circuit 42 reads out a signal directly from the photometric sensor 26 and calculates block-by-block luminance signals of several hundred blocks so as to obtain a photometric value for use in determining a camera exposure.

The sequence in FIG. 13B differs from the sequence in FIG. 13A in that face detection is not performed. Thus, immediacy after completing the various data corrections on each piece of focus detecting digital data, the control circuit 41 selects a distance measurement position at which focus should be achieved. After that, the control circuit 41 calculates an amount of lens movement for achieving focus in accordance with a focusing state at the distance measurement position based on the focus detecting digital data. It should be noted that the distance measurement position at which focus should be achieved may be designated in advance using the operating switch member 48. The calculated amount of lens movement is then output to the control circuit 41. The lens control circuit 51 outputs a signal to the second motor driver 52 to drive the second motor 53 so that the focus adjusting lens 30d can be moved in accordance with the output amount of lens movement. It should be noted that moving the focus adjusting lens 30d causes information from the distance encoder 56 to change, and hence the control circuit 41 updates information on the optical lens group 30 as well.

On the other hand, in accordance with a predetermined algorithm, the control circuit 41 computes a photometric value for calculating a camera exposure by weighted averaging or the like on the block-by-block luminance signals in the respective blocks calculated by the signal processing circuit 42. Based on the computed photometric value, the control circuit 41 determines an accumulation time period (that is, a shutter speed) for the image pickup device 12 and an aperture value best suited to shooting based on a predetermined program chart and a predetermined image pickup sensitivity. The determined shutter speed and aperture value are displayed on the display 44. It should be noted that in a case where one of the shutter speed and the aperture value is preset, the other one is determined so that it can achieve the optimum exposure in combination with the preset value.

The time at which the whole of the sequence described above is completed is a time tcme, but as compared to, the time period from the time tcm0 to the time tcme in the sequence 11B in which the face detecting process 1 is not carried out is shorter than in the sequence in FIG. 13A in which the face detecting process 1 is carried out.

It should be noted that in both of the sequences in FIGS. 13A and 13B, when the AF mode is set to the one-shot AF mode, the operation from signal the accumulation in the focus detecting sensor 20 to the movement of the focus adjusting lens 30d, that is, the operation illustrated in the upper row in each figure is not performed between continuous shooting frames.

When the sequence in FIG. 13A or 13B is completed, the process proceeds to step S125 in FIG. 7 referred to here again, in which a pre-flashing process is carried out. Face detection is also performed as the need arises based on a result of determination as to face detection in the sequential shooting frame-to-frame face detection selecting process in the step S123. As with the step S108 described earlier, an operating sequence performed in the step S125 is the same as the operating sequence in FIG. 12A or 12B.

When face detection using an image obtained during pre-flashing is selected in the step S177, S180, or S181, the control circuit 41 performs the sequence in FIG. 12A. However, in a case where, for example, the face detecting process 1 under ambient light described with reference to FIG. 13A has not been completed, the sequence illustrated in FIG. 12B is performed because it is possible to carry out the face detecting process 2 after the face detecting process 1 is completed.

On the other hand, when it is determined in the step S179 or S182 that face detection using an image obtained during pre-flashing is not to be carried out, the control circuit 41 performs the sequence illustrated in FIG. 12C. The other features are the same as those in the step S108 described earlier.

When the sequence in FIG. 12A, 12B, or 12C is completed, the process proceeds to step S126 in FIG. 6 referred to here again, in which the control circuit 41 outputs a signal to the shutter driver 49, causing the mechanical shutter 10 to open. As a result, a light beam from the interchangeable lens 2 enters the image pickup device 12 to enable image pickup. After that, the control circuit 41 gives an instruction to the signal processing circuit 42 so that signal accumulation in the image pickup device 12 can be performed for an accumulation time period according to a shutter time period computed in the step S106 and at a gain appropriate to a predetermined image pickup sensitivity. In synchronization with this image pickup timing, the control circuit 41 gives a flash firing instruction to the flash control circuit 61. In accordance with the flash firing instruction, the flash control circuit 61 causes the xenon tube 34 to emit light based on an output signal from the monitor sensor 37 such that the amount of light can be equal to the amount calculated in the step S108. As a result, an image is picked up with a flash fired.

When the image pickup is completed, a signal is output to the shutter driver 49, bringing the mechanical shutter 10 into a light-shielding state. As a result, the image pickup device 12 is shielded from a light beam from the interchangeable lens 2.

In step S127, the control circuit 41 outputs information to the lens control circuit 51 so as to open the diaphragm 31. In accordance with this information, the lens control circuit 51 outputs a signal to the third motor driver 54, which in turn runs the third motor 55 to drive the diaphragm 3. This brings the interchangeable lens 2 into an aperture-opened state. The lens control circuit 41 also outputs a control signal to the first motor driver 46, which in turn runs the first motor 47 to flip down the main mirror 13 and the first reflective mirror 14.

In step S128, the control circuit 41 successively reads out picked-up image information from the image pickup device 12 while performing analog-to-digital conversion thereof and instructs the signal processing circuit 42 to carry out a correction process and an interpolation process that are required.

In step S129, the control circuit 41 instructs the signal processing circuit 42 to make a white balance adjustment on the picked-up image information. Specifically, in the picked-up image information, a screen is divided into a plurality of areas, and white areas of a subject are extracted from color differential signals in the respective areas. Further, based on the signals in the extracted areas, red-channel and blue-channel blue gain correction is performed for the entire screen to make the white balance adjustment.

In step S130, the control circuit 41 instructs the signal processing circuit 42 to convert the picked-up image information, which has been subjected to the white balance adjustment, into a recording file format and store it in the storage medium 45.

In step S131, the control circuit 41 determines whether or not the camera 100 is placed in the continuous shooting mode, and the release switch of the operating switch member 48 is still on. When the camera 100 is placed in the continuous shooting mode, and the release switch of the operating switch member 48 is still on, the process returns to the step S121 so that the control circuit 41 can continue to carry out the continuous shooting process. When the release switch of the operating switch member 48 is not on, the control circuit 41 ends the present process.

It should be noted that the face detecting processes in FIGS. 8 and 9 are merely examples, and hence all of the judgment conditions in FIG. 8 or 9 should not necessarily be satisfied, but judgments may be made only for some of the judgment conditions. For example, a judgment may be made only for the shooting mode setting. In this case, when the camera 100 is placed in the people shooting mode, face detection is performed for an image obtained under ambient light and an image obtained during pre-flashing, and when the camera 100 is not placed in the non-people shooting mode, face detection is not performed for either of them. Alternatively, judgments may be made for judgment conditions other than those in FIGS. 8 and 9. For example, if the user can select a face priority mode which is a flash exposure compensation utility, face detection is performed for an image obtained under ambient light and an image obtained during pre-flashing when the camera 100 is placed in the face priority mode, and face detection is not performed for either of them when the camera 100 is not placed in the face priority mode.

Moreover, although in the above description of the present embodiment, face detection is taken as an example, a human head or upper body, a specific individual, a specific animal, or the like may be detected.

According to the first embodiment described above, only when the user sets mode setting conditions and shooting conditions for the camera 100, a method to detect a subject and whether or not to execute it is set in well-balance. In addition, an increase in shutter release time lag, and an excessive decrease in continuous shooting speed can be prevented.

In the first embodiment, as shown in the tables in FIGS. 10A and 10B, whether to perform face detection under ambient light or face detection during pre-flashing is selected according to mode setting conditions and shooting conditions for the camera 100 which are set by the user. This prevents an increase in shutter release time lag and an excessive decrease in continuous shooting speed. However, face detection is performed both under ambient light and during pre-flashing, depending on mode setting conditions and shooting conditions for the camera 100. In a second embodiment of the present invention, the time period required for face detection is reduced in the case where face detection is performed both under ambient light and during pre-flashing.

It should be noted that in the second embodiment, a face detecting process is carried out using the same hardware arrangement as that in the first embodiment, that is, the face detection circuit 42a. Accordingly, by carrying out at least one of time-saving processes 1 to 3 described below, the time period required for face detection is reduced by a predetermined amount in the case where face detection is performed both under ambient light and during pre-flashing. Here, the time-saving process 1 is a process in which a size of an image for face detection is reduced by resizing it. The time-saving process 2 is a process in which a size of an image for face detection is reduced by partially cutting (trimming) it off. The time-saving process 3 is a process in which a face size to be detected is limited without changing a size of an image to be detected.

These time-saving processes, however, have disadvantages. Specifically, the time-saving process 1 has a disadvantage that a minimum detectable face size will be increased. The time-saving process 2 has a disadvantage that a face outside a trimming range cannot be detected. The time-saving process 3 has a disadvantage that a minimum face size which can be detected in a case where a minimum face size limit is set will be increased. Judgments need to be made for conditions allowing such disadvantages so as to reduce the time period required for face detection to the extent possible in the case where detection is performed both under ambient light and during pre-flashing.

Accordingly, in the second embodiment, a table in FIG. 14 is used in place of the table in FIG. 10A for a pre shooting start face detection selecting process, and a table in FIG. 15 is used in place of the table in FIG. 10B for a continuous shooting frame-to-frame face detection selecting process as distinct from the first embodiment. It should be noted that the tables in FIGS. 14 and 15 are stored in the storage medium 45 as with the tables in FIGS. 10A and 10B.

First, a description will be given of differences between the first embodiment and the second embodiment in terms of the pre shooting start face detection selecting process. In the second embodiment, the condition (7) in FIG. 10A showing the procedure in the first embodiment is divided into three conditions (7)-1, (7)-2, and (7)-3 as shown in FIG. 14.

The condition (7) in FIG. 10A is for proceeding to the step S157 in the flowchart of FIG. 8, whereas in the second embodiment, there are three conditions for it. Specifically, the condition (7)-1 is that the shooting mode is set to the general-purpose mode in which shooting is not limited to people shooting. The condition (7)-2 is that based on lens information, a shooting magnification can be estimated to be one at which an image in a predetermined size or larger is taken by shooting a target. When the condition (7)-1 or (7)-2 is satisfied, the time-saving process 1 in which an image is resized or the time-saving process 3 in which a face size to be detected is limited is adopted for both an image obtained under ambient light and an image obtained during pre-flashing to reduce the time period required for face detection. In FIG. 14, a resizing operation is represented as R, and a face size limiting operation is represented as L. On the other hand, when neither of the conditions (7)-1 and (7)-2 is satisfied, that is, when the condition (7)-3 is satisfied, the same method as that in the first embodiment is used to perform face detection with an image obtained at the time of metering before the start of shooting and an image obtained at the time of metering during pre-flashing. Under the other conditions, the pre shooting start face detection selecting process identical with that in the first embodiment is carried out in the second embodiment.

Next, a description will be given of differences between the first embodiment and the second embodiment in terms of the continuous shooting frame-to-frame face detection selecting process. In the second embodiment, each of the conditions (3), (4), and (8) in FIG. 10B showing the procedure in the first embodiment is divided into two conditions i.e. (3)-1 and (3)-2, (4)-1 and (4)-2, and (8)-1 and (8)-2, respectively, as shown in FIG. 15.

The condition (3) in FIG. 10B is for proceeding from the step S173 to the step S181 in the flowchart of FIG. 9, whereas in the second embodiment, there are two conditions for it. Specifically, the condition (3)-2 is that a face size detected during the previous metering is larger than a predetermined size. The condition (3)-1 is that the condition (3)-2 is not satisfied. When the condition (3)-1 is satisfied, the same method as that in the first embodiment is used to perform face detection with an image obtained under ambient light and an image obtained during pre-flashing. On the other hand, when the conditions (3)-2 is satisfied, the time-saving process 1 in which an image is resized or the time-saving process 3 in which a face size to be detected is limited is adopted to reduce the time period required for face detection.

The condition (4) in FIG. 10B is for proceeding from the step S174 to the step S181 in the flowchart of FIG. 9, whereas in the second embodiment, there are two conditions for it. Specifically, the condition (4)-2 is that a face size detected during the last metering is larger than a predetermined size. The condition (4)-1 is that the condition (4)-2 is not satisfied. When the condition (4)-1 is satisfied, the same method as that in the first embodiment is used to perform face detection with an image obtained under ambient light and an image obtained during pre-flashing. On the other hand, when the conditions (4)-2 is satisfied, the time-saving process 1 in which an image is resized or the time-saving process 3 in which a face size to be detected is limited is adopted to reduce the time period required for face detection. In FIG. 15, a resizing operation is represented as R, and a face size limiting operation is represented as L.

The condition (8) in FIG. 10B is for proceeding from the step S176 to the step S177 in the flowchart of FIG. 9, and as described earlier, this is the condition that face detection could not be performed although a face detecting process was carried out during the last metering. In the second embodiment, this condition is divided into the condition (8)-2 that face detection could not be performed by carrying out a face detecting process during the second last metering, and the condition (8)-1 that the condition (8)-2 is not satisfied. When the condition (8)-1 is satisfied, the same method is used as in the first embodiment to perform face detection with an image obtained under ambient light and an image obtained during pre-flashing. On the other hand, when the conditions (8)-2 is satisfied, the time-saving process 2 in which an image for use in face detection is trimmed to leave an area where there is likely to be a face is used to perform face detection with an image obtained under ambient light and an image obtained during pre-flashing. In FIG. 15, a trimming operation is represented as T, and under this condition, the time period required for face detection can be reduced. Under the other conditions, the continuous shooting frame-to-frame face detection selecting process identical with that in the first embodiment is carried out in the second embodiment.

This concludes the description of the second embodiment.

It should be noted that not only in the cases described above for the first and second embodiments but also in a case where the equal priority mode is selected for the setting items (4) to (6) described with reference to FIG. 5, the time-saving process 1 in which an image is resized or the time-saving process 3 in which a face size to be detected is limited may be adopted to reduce the time period required for face detection. Moreover, in a case where a range in which focus detection is performed by the focus detecting sensor 20 is limited to a predetermined range designated by the user, the time-saving process 2 in which a trimmed image covering that range is created may be adopted to reduce the face detection time period.

Although in the second embodiment, the photometric sensor 26 provided separately from the image pickup device 12 performs metering when a pre-flash is fired, the same technique may also be applied to a case where the image pickup device 12 performs metering when a pre-flash is fired.

The image pickup apparatus according to the present invention is not limited to the camera 100 of the first and second embodiments described above, but may be applied to apparatuses such as a digital camera and a film camera which are used in combination with a flash photography.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-029680, filed Feb. 21, 2019, which is hereby incorporated by reference herein in its entirety.

What is claimed is:

1. An image pickup apparatus capable of photography with a flash, the image pickup apparatus comprising:
a sensor comprising a plurality of pixels; and
at least one processor or circuit configured to function as:
a detection unit configured to detect an area of a subject from an image generated by the sensor;
a selecting unit configured to, based on conditions as to shooting, select, for the detecting process, at least one of a first image generated based on a signal from the sensor when the flash does not fire a flash, and a second image generated based on a signal from the sensor when the flash fires a preflash;
an obtaining unit configured to obtain luminance information on the area of the subject from at least one of the first and second images for which it has been determined that the detecting process is to be carried out; and
a computation unit configured to compute an amount of main flash output from the flash based on the luminance information obtained by the obtaining unit,
wherein, in a case that a first condition as to shooting is satisfied, the selecting unit selects the first image and the computation unit computes an amount of the main flash output from the flash based on the luminance information of the first image obtained by the obtaining unit, and
wherein, in a case that a second condition as to shooting is satisfied, the selecting unit selects the second image and the computation unit computes an amount of the main flash output from the flash based on the luminance information of the second image obtained by the obtaining unit.

2. The image pickup apparatus according to claim 1, wherein the conditions as to shooting comprise at least one of the following: a shooting mode setting, a continuous shooting speed setting, an AF mode setting, a setting as to accurate focus and immediate shooting, and a setting as to subject tracking.

3. The image pickup apparatus according to claim 1, wherein the conditions as to shooting comprise information on shooting comprising at least one piece of the following: information on a subject distance, information on a subject luminance, and information on previous subject detection.

4. The image pickup apparatus according to claim 1, wherein the selecting unit selects whether or not to carry out the detecting process for each of the first and second images before start of shooting.

5. The image pickup apparatus according to claim 1, wherein the selecting unit selects whether or not to carry out the detecting process for each of the first and second images between continuous shooting frames.

6. The image pickup apparatus according to claim 1, further comprising a table for the selecting unit to select whether or not to carry out the detecting process for each of the first and second images according to the conditions as to shooting.

7. A control method for an image pickup apparatus capable of photography with a flash, the control method comprising:
obtaining signals from a sensor comprising a plurality of pixels;
carrying out a detecting process in which an area of a subject is detected from an image generated from the obtained signals;
based on conditions as to shooting, selecting, for the detecting process, at least one of a first image generated based on a signal from the sensor when the flash does not fire a flash, and a second image generated based on a signal from the sensor when the flash fires a pre-flash;
obtaining luminance information on the area of the subject from at least one of the first and second images for which it has been determined that the detecting process is to be carried out; and
computing an amount of main flash output from the flash based on the obtained luminance information,
wherein, in a case that a first condition as to shooting is satisfied, selecting the first image and computing an amount of the main flash output from the flash based on the obtained luminance information of the first image, and
wherein, in a case that a second condition as to shooting is satisfied, selecting the second image and computing an amount of the main flash output from the flash based on the obtained luminance information of the second image.

8. A non-transitory computer-readable storage medium storing a program for causing a computer to execute a control method for an image pickup apparatus capable of photography with a flash, the control method comprising:
obtaining signals from a sensor comprising a plurality of pixels;
carrying out a detecting process in which an area of a subject is detected from an image generated from the obtained signals;
based on conditions as to shooting, selecting, for the detecting process, at least one of a first image generated based on a signal from the sensor when the flash does not fire a flash, and a second image generated based on a signal from the sensor when the flash fires a pre-flash;

obtaining luminance information on the area of the subject from at least one of the first and second images for which it has been determined that the detecting process is to be carried out; and computing an amount of main flash output from the flash based on the obtained luminance information, wherein in a case that a first condition as to shooting is satisfied, selecting the first image, and computing an amount of the main flash output from the flash based on the obtained luminance information of the first image, and wherein, in a case that a second condition as to shooting is satisfied, selecting the second image, and computing an amount of the main flash output from the flash based on the obtained luminance information of the second image.

9. An image pickup apparatus capable of photography with a flash, the image pickup apparatus comprising:

a sensor comprising a plurality of pixels; and at least one processor or circuit configured to function as:

a detection unit configured to detect an area of a subject from an image generated by the sensor;

a selecting unit configured to, based on conditions as to shooting, select, for the detecting process, at least one of a first image generated based on a signal from the sensor when the flash does not fire a flash and a second image generated based on a signal from the sensor when the flash fires a preflash;

an obtaining unit configured to obtain luminance information on the area of the subject from at least one of the first and second images for which it has been determined that the detecting process is to be carried out; and a computation unit configured to compute an amount of main flash output from the flash based on the luminance information obtained by the obtaining unit, wherein, in a case that a first condition as to shooting is satisfied, the selecting unit selects the first image, and the computation unit computes an amount of the main flash output from the flash based on the luminance information of the first image obtained by the obtaining unit, and wherein, in a case that a second condition as to shooting is satisfied, the selecting unit selects the first image and the second image, and the computation unit computes an amount of the main flash output from the flash based on the luminance information of the first image and the second image obtained by the obtaining unit.

10. The image pickup apparatus according to claim 9, wherein the conditions as to shooting comprise at least one of the following: a shooting mode setting, a continuous shooting speed setting, an AF mode setting, a setting as to accurate focus and immediate shooting, and a setting as to subject tracking.

11. The image pickup apparatus according to claim 9, wherein the conditions as to shooting comprise information on shooting comprising at least one piece of the following: information on a subject distance, information on a subject luminance, and information on previous subject detection.

12. The image pickup apparatus according to claim 9, wherein, when the selecting unit decides to carry out the detecting process for both of the first image and the second image, at least one of a time-saving process in which both of the generated images are reduced, a time-saving process in which both of the generated images are trimmed, and a time-saving process in which a size of a subject to be detected from both of the generated images is limited is also additionally carried out according to the conditions as to shooting when the detecting process is carried out.

13. An image pickup apparatus capable of photography with a flash, the image pickup apparatus comprising:

a sensor comprising a plurality of pixels; and at least one processor or circuit configured to function as:

a detection unit configured to detect an area of a subject from an image generated by the sensor;

a selecting unit configured to, based on conditions as to shooting, select, for the detecting process, at least one of a first image generated based on a signal from the sensor when the flash does not fire a flash and a second image generated based on a signal from the sensor when the flash fires a preflash or the second image;

an obtaining unit configured to obtain luminance information on the area of the subject from at least one of the first and second images for which it has been determined that the detecting process is to be carried out; and a computation unit configured to compute an amount of main flash output from the flash based on the luminance information obtained by the obtaining unit, wherein, in a case that a first condition as to shooting is satisfied, the selecting unit selects the second image, and the computation unit computes an amount of the main flash output from the flash based on the luminance information of the second image obtained by the obtaining unit, and wherein, in a case that a second condition as to shooting is satisfied, the selecting unit selects the first image and the second image and the computation unit computes an amount of the main flash output from the flash based on the luminance information of the first image and the second image obtained by the obtaining unit.

14. The image pickup apparatus according to claim 13, wherein the conditions as to shooting comprise at least one of the following: a shooting mode setting, a continuous shooting speed setting, an AF mode setting, a setting as to accurate focus and immediate shooting, and a setting as to subject tracking.

15. The image pickup apparatus according to claim 13, wherein the conditions as to shooting comprise information on shooting comprising at least one piece of the following: information on a subject distance, information on a subject luminance, and information on previous subject detection.

16. The image pickup apparatus according to claim 13, wherein when the selecting unit decides to carry out the detecting process for both of the first image and the second image, at least one of a time-saving process in which both of the generated images are reduced, a time-saving process in which both of the generated images are trimmed, and a time-saving process in which a size of a subject to be detected from both of the generated images is limited is also additionally carried out according to the conditions as to shooting when the detecting process is carried out.

17. A control method for an image pickup apparatus capable of photography with a flash, the control method comprising:

obtaining signals from a sensor comprising a plurality of pixels;

carrying out a detecting process in which an area of a subject is detected from an image generated from the obtained signals;

based on conditions as to shooting, selecting, for the detecting process, at least one of a first image generated based on a signal from the sensor when the flash does not fire a flash, and a second image generated based on a signal from the sensor when the flash fires a pre-flash;

obtaining luminance information on the area of the subject from at least one of the first and second images for which it has been determined that the detecting process is to be carried out; and computing an amount of main flash output from the flash based on the obtained luminance information, wherein, in a case that a first condition as to shooting is satisfied, selecting the first image, and computing an amount of the main flash output from the flash based on the obtained luminance information of the first image, and wherein, in a case that a second condition as to shooting is satisfied, selecting the first image and the second image, and computing an amount of the main flash output from the flash based on the obtained luminance information of the first image and the second image.

18. A non-transitory computer-readable storage medium storing a program for causing a computer to execute a control method for an image pickup apparatus capable of photography with a flash, the control method comprising:

obtaining signals from a sensor comprising a plurality of pixels;

carrying out a detecting process in which an area of a subject is detected from an image generated from the obtained signals;

based on conditions as to shooting, selecting, for the detecting process, at least one of a first image generated based on a signal from the sensor when the flash does not fire a flash, and a second image generated based on a signal from the sensor when the flash fires a pre-flash;

obtaining luminance information on the area of the subject from at least one of the first and second images for which it has been determined that the detecting process is to be carried out; and computing an amount of main flash output from the flash based on the obtained luminance information, wherein, in a case that a first condition as to shooting is satisfied, selecting the first image, and computing an amount of the main flash output from the flash based on the obtained luminance information of the first image, and wherein, in a case that a second condition as to shooting is satisfied, selecting the first image and the second image, and computing an amount of the main flash output from the flash based on the obtained luminance information of the first image and the second image.

19. A control method for an image pickup apparatus capable of photography with a flash, the control method comprising:

obtaining signals from a sensor comprising a plurality of pixels;

carrying out a detecting process in which an area of a subject is detected from an image generated from the obtained signals;

based on conditions as to shooting, selecting, for the detecting process, at least one of a first image generated based on a signal from the sensor when the flash does not fire a flash, and a second image generated based on a signal from the sensor when the flash fires a pre-flash;

obtaining luminance information on the area of the subject from at least one of the first and second images for which it has been determined that the detecting process is to be carried out, and computing an amount of main flash output from the flash based on the obtained luminance information, wherein, in a case that a first condition as to shooting is satisfied, selecting the second image, and computing an amount of the main flash output from the flash based on the obtained luminance information of the second image, and wherein, in a case that a second condition as to shooting is satisfied, selecting the first image and the second image, and computing an amount of the main flash output from the flash based on the obtained luminance information of the first image and the second image.

20. A non-transitory computer-readable storage medium storing a program for causing a computer to execute a control method for an image pickup apparatus capable of photography with a flash, the control method comprising:

obtaining signals from a sensor comprising a plurality of pixels;

carrying out a detecting process in which an area of a subject is detected from an image generated from the obtained signals;

based on conditions as to shooting, selecting, for the detecting process, at least one of a first image generated based on a signal from the sensor when the flash does not fire a flash, and a second image generated based on a signal from the sensor when the flash fires a pre-flash;

obtaining luminance information on the area of the subject from at least one of the first and second images for which it has been determined that the detecting process is to be carried out; and computing an amount of main flash output from the flash based on the obtained luminance information, wherein, in a case that a first condition as to shooting is satisfied, selecting the second image, and computing an amount of the main flash output from the flash based on the obtained luminance information of the second image, and wherein, in a case that a second condition as to shooting is satisfied, selecting the first image and the second image, and computing an amount of the main flash output from the flash based on the obtained luminance information of the first image and the second image.

* * * * *